(12) United States Patent
Srichai et al.

(10) Patent No.: US 10,436,495 B2
(45) Date of Patent: Oct. 8, 2019

(54) INTEGRATED THERMAL ENERGY MODULE WITHIN AN AIR-COOLED EVAPORATOR DESIGN

(71) Applicant: THERMO KING CORPORATION, Minneapolis, MN (US)

(72) Inventors: Panayu Robert Srichai, Minneapolis, MN (US); Vladimir Sulc, Minnetonka, MN (US); Gary O. McGinley, Lakeville, MN (US); Eric Kirby, Bloomington, MN (US); Christopher L Ganshert, Lakeville, MN (US); Christopher J. Kroeker, Edina, MN (US); Casey Briscoe, Hopkins, MN (US)

(73) Assignee: Thermo King Corporation, Minneapolis, MN (US)

( * ) Notice: Subject to any disclaimer, the term of this patent is extended or adjusted under 35 U.S.C. 154(b) by 598 days.

(21) Appl. No.: 15/141,448

(22) Filed: Apr. 28, 2016

(65) Prior Publication Data
US 2016/0334154 A1    Nov. 17, 2016

Related U.S. Application Data

(60) Provisional application No. 62/155,940, filed on May 1, 2015.

(51) Int. Cl.
*F25D 16/00* (2006.01)
*F25D 17/06* (2006.01)
(Continued)

(52) U.S. Cl.
CPC ............... *F25D 16/00* (2013.01); *F25B 5/00* (2013.01); *F25D 17/067* (2013.01);
(Continued)

(58) Field of Classification Search
CPC .. F25B 2600/2511; F25D 16/00; F28D 20/02; Y02E 60/145
See application file for complete search history.

(56) References Cited

U.S. PATENT DOCUMENTS

| 4,741,171 A | 5/1988 | Toshiyuki |
|---|---|---|
| 4,918,936 A | 4/1990 | Sakamoto |

(Continued)

FOREIGN PATENT DOCUMENTS

| JP | 57-08214 | 5/1982 |
|---|---|---|
| JP | 59-129064 | * 8/1984 |

(Continued)

OTHER PUBLICATIONS

European Search Report issued in European Application No. 16789793.3 dated Sep. 21, 2018 (7 pages).
(Continued)

*Primary Examiner* — Henry T Crenshaw
(74) *Attorney, Agent, or Firm* — Hamre, Schumann, Mueller & Larson, P.C.

(57) ABSTRACT

A transport refrigeration unit (TRU) includes a compressor. The TRU further includes a condenser disposed downstream of the compressor. The TRU further includes an expansion device disposed downstream of the condenser. The TRU further includes a first flow control device disposed downstream of the condenser. The TRU further includes a first evaporator disposed downstream of the expansion device and the first flow control device. The first evaporator is disposed upstream of a second flow control device. The second evaporator is disposed downstream of the first flow control device, the expansion device, and the second flow control device. The second evaporator includes a thermal accumulator. The second flow control device disposed upstream of the compressor.

16 Claims, 11 Drawing Sheets

(51) Int. Cl.
*F28D 20/02* (2006.01)
*F25B 5/00* (2006.01)
*F28F 1/12* (2006.01)
*F25D 29/00* (2006.01)
*F25B 41/04* (2006.01)
*F25D 17/04* (2006.01)
*F25D 19/00* (2006.01)

(52) U.S. Cl.
CPC .......... *F25D 29/003* (2013.01); *F28D 20/02* (2013.01); *F28F 1/122* (2013.01); *F25B 41/043* (2013.01); *F25B 2600/2511* (2013.01); *F25D 17/045* (2013.01); *F25D 19/003* (2013.01); *F25D 2317/0683* (2013.01); *F25D 2700/12* (2013.01); *Y02E 60/145* (2013.01)

(56) References Cited

U.S. PATENT DOCUMENTS

| | | | | |
|---|---|---|---|---|
| 5,241,838 | A * | 9/1993 | Kennedy | B21C 37/26 165/184 |
| 5,598,716 | A * | 2/1997 | Tanaka | F25D 16/00 62/185 |
| 2002/0088246 | A1 | 7/2002 | Bureau | B60H 1/00321 62/434 |
| 2003/0159455 | A1* | 8/2003 | Aikawa | B60H 1/005 62/225 |
| 2005/0188717 | A1* | 9/2005 | Aikawa | F25B 41/00 62/434 |
| 2006/0218952 | A1 | 10/2006 | Nagae et al. | |
| 2009/0188266 | A1 | 7/2009 | Hung et al. | |
| 2011/0146266 | A1* | 6/2011 | Weinbrenner | F02B 29/0412 60/599 |
| 2015/0316301 | A1* | 11/2015 | Kolda | B60H 1/005 62/77 |
| 2016/0250906 | A1* | 9/2016 | Xia | B60H 1/005 165/202 |
| 2017/0307263 | A1* | 10/2017 | Ma | F28D 20/02 |
| 2018/0100676 | A1* | 4/2018 | Stitou | F25B 17/08 |

FOREIGN PATENT DOCUMENTS

| | | |
|---|---|---|
| JP | 59129064 | 8/1984 |
| JP | 04-356677 | 12/1992 |
| JP | 11-321293 | 11/1999 |
| JP | 2000304397 | 11/2000 |
| WO | 2013165535 | 11/2013 |
| WO | 2015030915 | 3/2015 |

OTHER PUBLICATIONS

International Search Report issued in corresponding International Application No. PCT/US2016/029840 dated Jul. 29, 2016 (3 pages).
Written Opinion issued in corresponding International Application No. PCT/US2016/029840 dated Jul. 29, 2016 (8 pages).
FASL, "Modeling and Control of Hybrid Vapor Compression Cycles" 175 pages (2013).

* cited by examiner

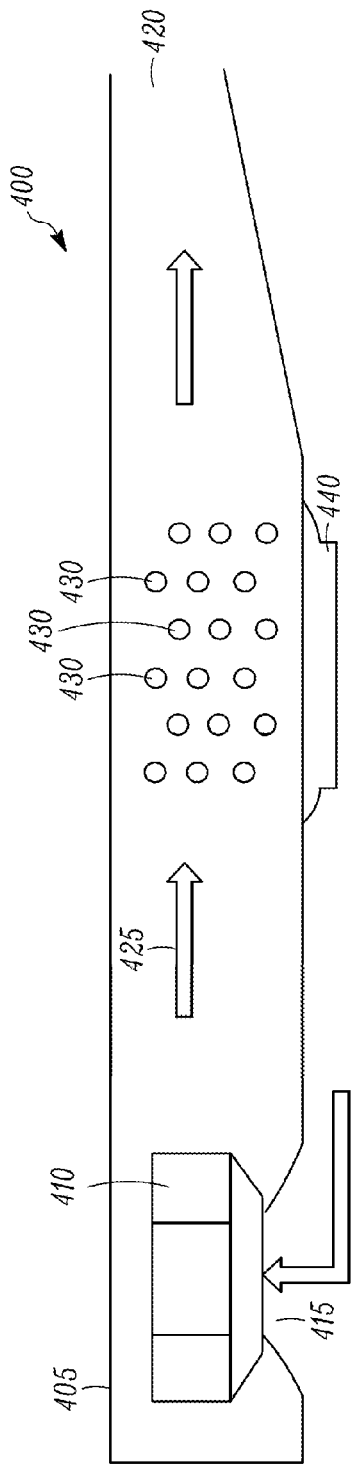
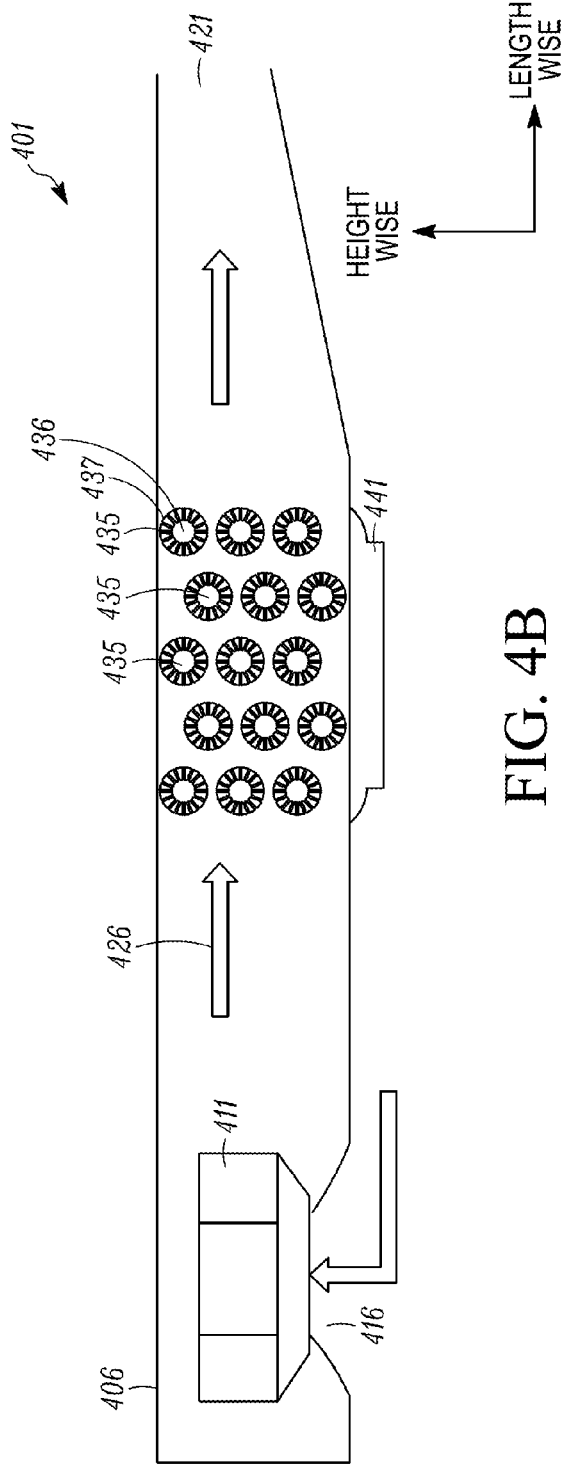

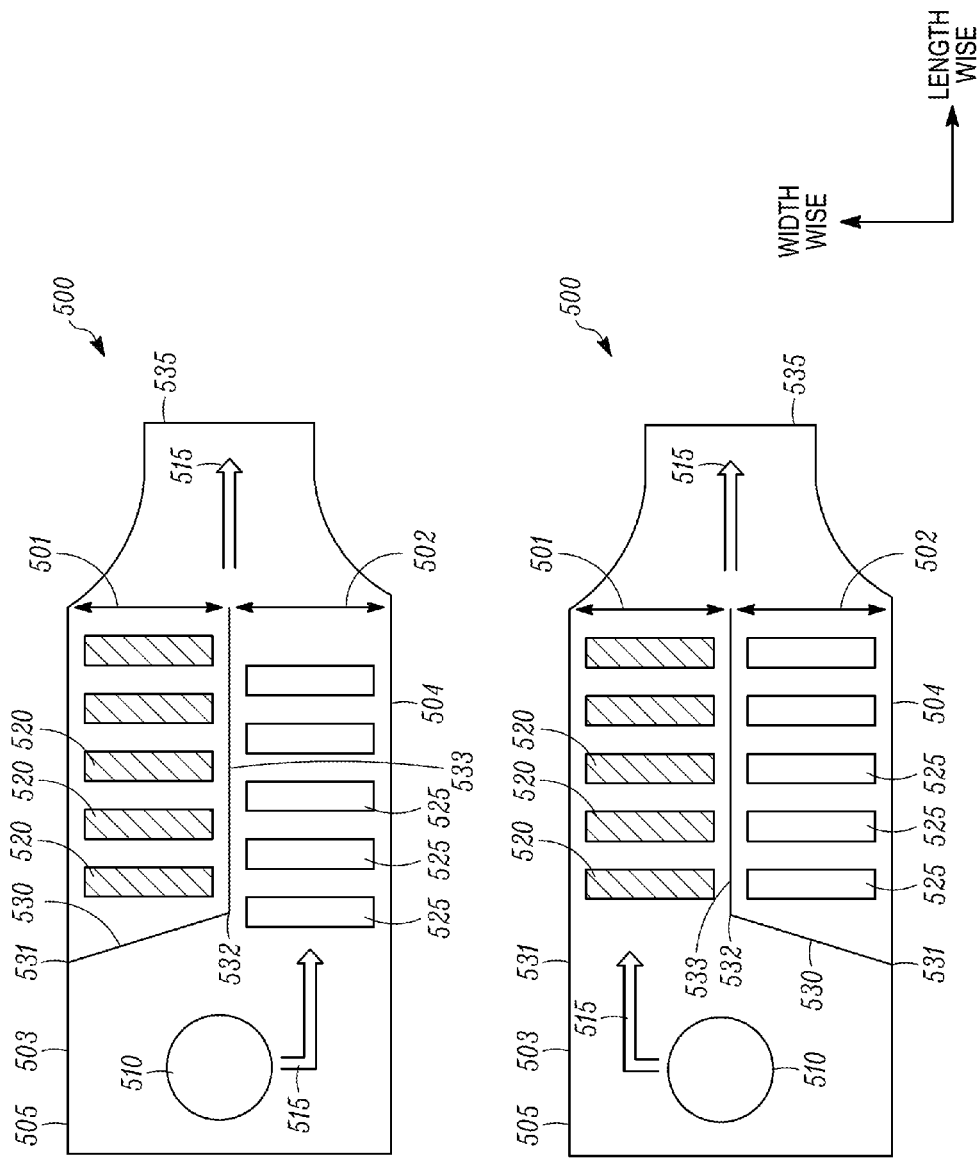

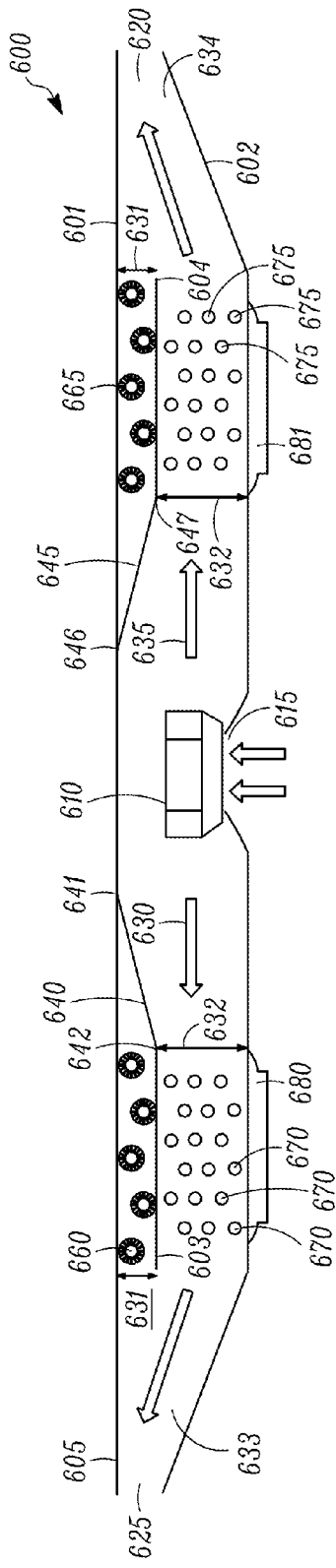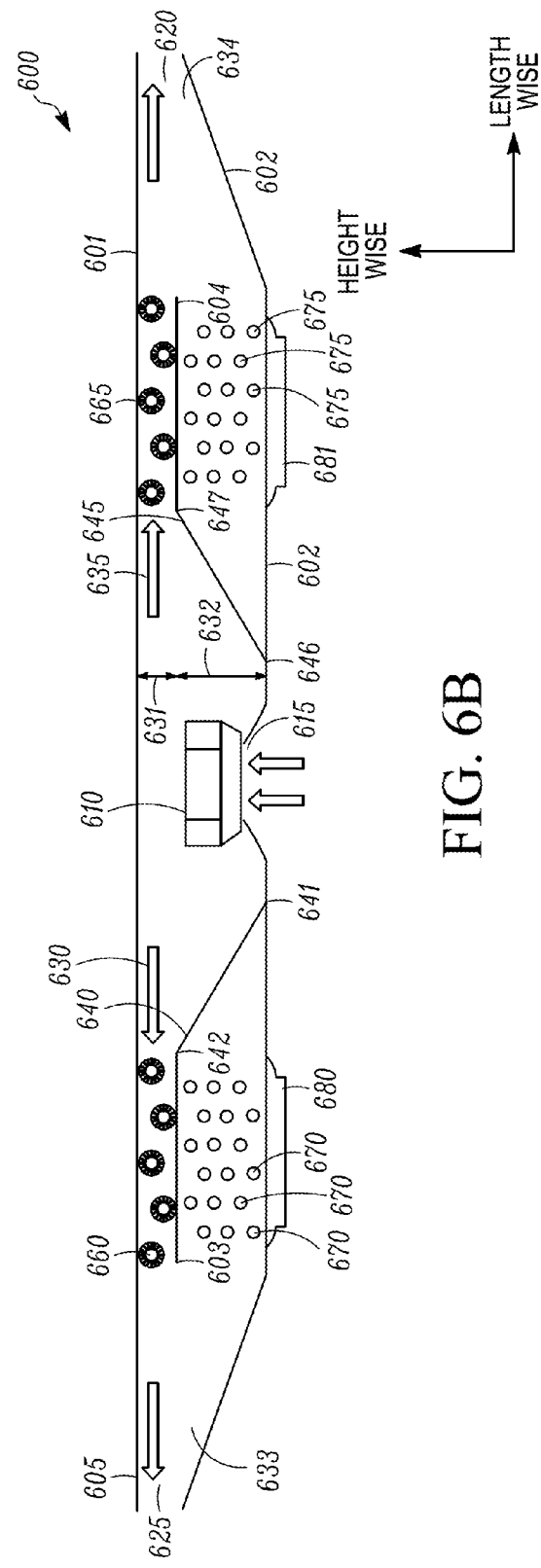
FIG. 6A
FIG. 6B

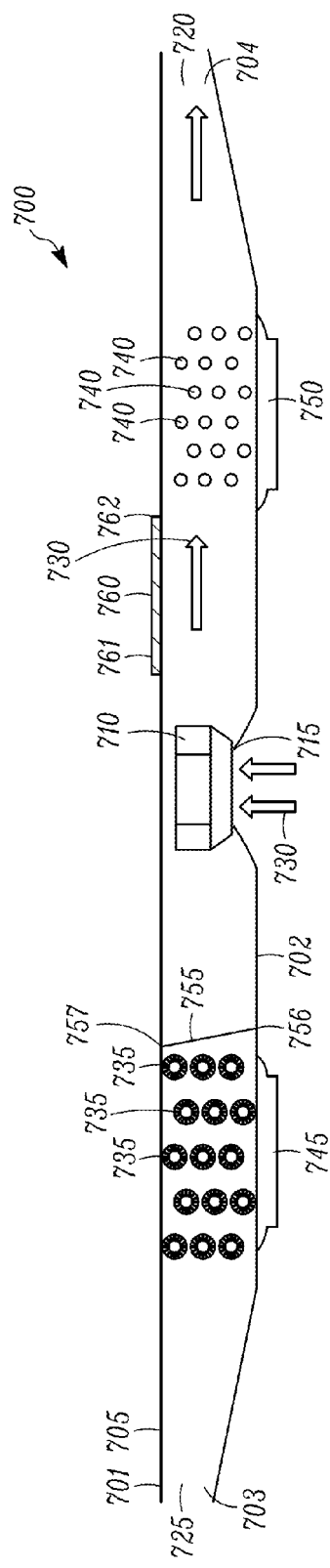
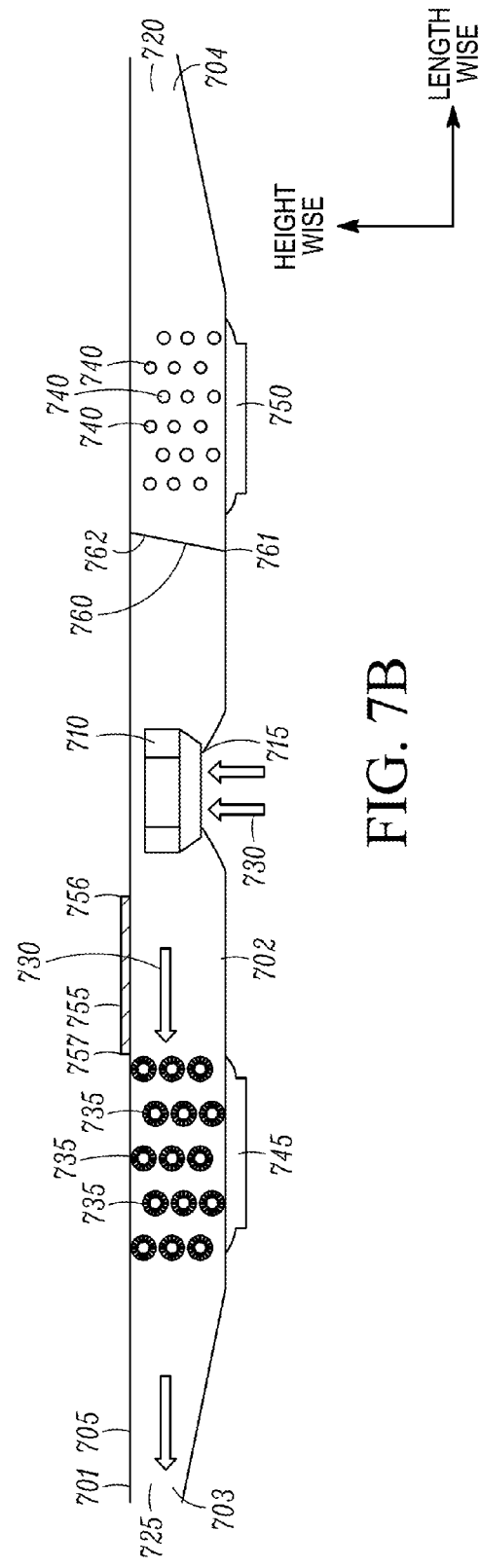
FIG. 7A
FIG. 7B

INTEGRATED THERMAL ENERGY MODULE WITHIN AN AIR-COOLED EVAPORATOR DESIGN

FIELD

Embodiments of this disclosure relate to au integrated thermal energy module within an air-cooled evaporator design.

BACKGROUND

A refrigerated transport unit is commonly used to transport perishable items such as, but not limited to, produce, frozen foods, and meat products. Generally, the refrigerated transport unit includes a transport refrigeration system (TRS) that is configured to provide climate control of an interior space, e.g., cargo space, of a transport unit. Examples of a transport unit can include, but are not limited to, a ship board container, an air cargo container or cabin, au over the road truck cabin, or the like. The TRS can include, without limitation, a transport, refrigeration unit (TRU), sensors, controller, genset, or the like. The TRS is generally used to control an environmental condition such as, but not limited to, temperature and/or humidity of an interior space of a transport unit. A TRU may include, without limitation, a compressor, a condenser, an expansion valve, an evaporator, and fans or blowers to control the heat exchange between the air inside the cargo space and the ambient air outside of the refrigerated transport unit.

SUMMARY

Embodiments of this disclosure relate to an integrated thermal energy module within the air-cooled evaporator design.

The integrated thermal energy module can be used for "hold-over" climate control capacity when, for example, a major power source of climate control is not available.

The embodiments disclosed herein can provide a refrigeration system with both a conventional evaporator and a thermal accumulator evaporator, to some embodiments, the thermal accumulator evaporator can be used to provide "hold-over" climate control capacity when, for example, a major power source of climate control is not available. In some embodiments, the thermal accumulator evaporator can be used with the conventional evaporator to boost cooling and/or heating capacity of the refrigeration system. In some embodiments, a heat transfer fluid can be directed to both the conventional evaporator and the thermal accumulator evaporator for controlling cooling and or beating capacity of the refrigeration system, hi some embodiments, the heat transfer fluid can be directed to both the conventional evaporator and the thermal accumulator evaporator to modulate cooling and/or heating capacity of the refrigeration system A major power source of, for example, a TRU can be a diesel engine, an alternator, a generator, a battery, solar cells, or the like. There are situations that the major power source of the TRU becomes unavailable. In such situations, an independent temporary "hold-over" climate control capacity may become desired to provide continuous climate control.

In one example, a trailer required to deliver perishable cargo may be required to make intermittent stops. During these intermittent stops, the engine of the tractor may be turned-off and the primary climate control may become unavailable. Accordingly, a secondary hold-over climate control may be desired to maintain climate control within the trailer. The embodiments described herein can provide hold-over climate capacity in order to maintain temperature control within the trailer and prevent the perishable cargo from spoiling.

In yet another example, a cargo truck with a TRU may be required to travel through a noise regulated zoning area that requires an engine and/or genset powering the TRU for primary climate control, e.g. refrigeration, to be turned off. Thus, the power of the primary climate control may be unavailable due to noise regulations and a secondary hold-over climate control may be desired. The embodiments described herein can provide hold-over climate capacity in order to maintain temperature control within the truck and prevent perishable cargo within the track from spoiling.

Also, in another example, a passenger bus (e.g., school bus) may be required to make intermittent stops to allow passengers to get on and off the bus. The bus driver may want to turn off the engine for safety reasons or for energy conservation reasons. When the engine of the bus is turned off, the air conditioning may lose its power at id a secondary hold-over climate control may be desired. The embodiments described herein can provide hold-over climate capacity in order to maintain air conditioning within the passenger bus when the engine is turned off.

Further, in another example, a handicap transportation vehicle may be required to make intermittent stops to allow passengers requiring assistance to move into and out of the vehicle. During the slops, the driver of the vehicle may want to tarn off the engine for safety or energy conservation reasons. Thus, the handicap transportation vehicle may lose its power to provide air conditioning during stops and a secondary hold-over climate control may be desired. The embodiments described herein can provide hold-over climate capacity in order to maintain air conditioning within the handicap transportation vehicle when the engine is turned off.

Moreover, in another example, an airplane may be required to idol on at a gate or on a runway before takeoff and/or after landing. While idling, the power for the primary climate control may not be available and a secondary hold-over climate control may be desired. The embodiments described herein can provide hold-over climate capacity in order to maintain air conditioning/temperature control within the airplane when an engine of the airplane is idling or turned off.

Also, in another example, a cruise line ship may be required to idol at a harbor waiting for passengers to get on and off the ship or at sea because of weather concerns. While idling, the power for the primary climate control may not be available and a secondary hold-over climate control may be desired. The embodiments described herein can provide hold-over climate capacity in order to maintain air conditioning within the cruise line ship when the engine is idling or turned off.

Further, there can be non-transport examples (e.g., residential, and/or commercial structures) that may experience temporary power outages. During power outages, the air conditioning for the buildings may become unavailable and a secondary hold-over climate control may be desired. The embodiments described herein can provide hold-over climate capacity in order to maintain air conditioning within the structure until power is restored.

It is noted that the examples discussed above are in no way limiting to the application of the embodiments disclosed herein. The embodiments disclosed herein may be applied to any other situation in which secondary hold-over climate control may be required.

In one embodiment, a TRU can include a compressor. The TRU can further include a condenser disposed downstream of the compressor. The TRU can include an expansion device disposed downstream of the condenser. The TRU can include a first flow control device disposed downstream of the condenser. The TRU can include a first evaporator disposed downstream of the expansion device and the first flow control device. The first evaporator can be disposed upstream of a second flow control device. The second evaporator can be disposed downstream of the first flow control device, the expansion device, and the second flow control device. The second evaporator can include a thermal accumulator. The second flow control device can be disposed upstream of the compressor.

In another embodiment, a TRU can include a compressor. The TRU can include a condenser disposed downstream of the compressor. The TRU can include an expansion device disposed downstream of the condenser. The TRU can include a first flow control device disposed downstream of the condenser. The TRU can include a second flow control device disposed upstream of the compressor. The TRU can include an air discharge. The air discharge can include a housing. The housing can include an air intake port. The housing can include a first air discharge port. The housing can include an air blower creating a first air flow from the air intake port to the first air discharge port. The housing can include a first evaporator disposed in the housing. The first evaporator can be disposed downstream of the expansion device and the first flow control device. The first evaporator can be disposed upstream of the second flow control device. The housing can include a second evaporator disposed in the housing. The second evaporator can include downstream of the first flow control device, the expansion device, and the second flow control device. The second evaporator can include thermal accumulator. The TRU can include a dripping pan configured to collect condensation drippings of at least one of the evaporators.

In another embodiment, a TRU can include a compressor. The TRU can include a condenser disposed downstream of the compressor. The TRU can include an expansion device disposed downstream of the condenser. The TRU can include a first flow control device disposed downstream of the condenser. The TRU can include a second flow control device disposed upstream of the compressor. The TRU can include a first air discharge. The first air discharge can include a first housing. The first housing can include a first air intake port. The first housing can include a first air discharge port. The first housing can include a first air blower creating a first air flow from the first air intake port to the first air discharge port. The first housing can include a first evaporator disposed in the first housing. The first evaporator can be disposed downstream of the expansion device and the first flow control device. The first evaporator can be disposed upstream of the second flow control device. The first housing can include a first dripping pan configured to collect condensation drippings of the first evaporators. The TRU further includes a second air discharge. The second air discharge can include a second housing. The second housing can include a second air intake port. The second housing can include a second air discharge port. The second housing can include a second air blower creating a second air flow from the second air intake port to the second air discharge port. The second housing can include a second evaporator disposed in the second housing. The second evaporator can be disposed downstream of the first flow control device, the expansion device, and the second flow control device. The second evaporator can include thermal accumulator. The second housing can include a second dripping pan configured to collect condensation drippings of the second evaporators in one embodiment, a method of operating a TRU can include determining a target temperature for a climate temperature, determining whether climate control is required by comparing the climate temperature to the target temperature, determining whether power is available, directing air flow through a first evaporator when power is available, and directing air flow through a second evaporator that includes a thermal accumulator when power is not available.

BRIEF DESCRIPTION OF THE DRAWINGS

References are made to the accompanying drawings that from a part of this disclosure and which illustrate the embodiments in which the systems and methods described in this Specification can be practiced.

FIG. 4A illustrates a side view of an air discharge unit with a conventional evaporator, according to one embodiment FIG. 4B illustrates a side view of an air discharge unit with a thermal accumulator evaporator, according to one embodiment.

FIGS. 5A and 5B illustrate top views of an air discharge unit, wherein a conventional evaporator and a thermal accumulator evaporator are arranged in a widthwise direction, according to one embodiment.

FIGS. 6A and 6B illustrate side views of an air discharge unit with two conventional evaporators and two thermal accumulator evaporators arranged in a heightwise direction, according to one embodiment.

FIGS. 7A and 7B illustrate side views of an air discharge unit which has two air discharge ports, according to one embodiment.

DETAILED DESCRIPTION

Figure 1:
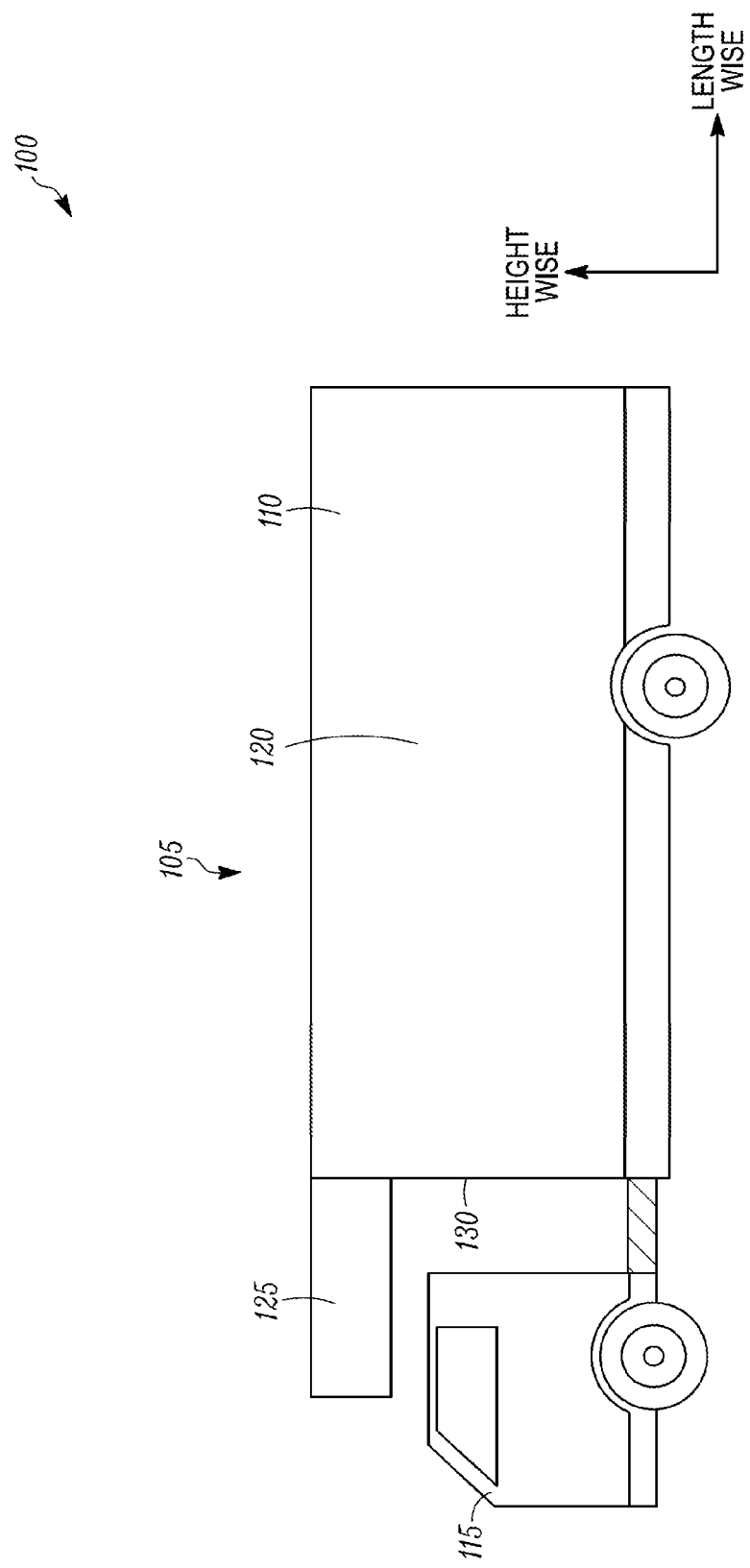
FIG. 1 illustrates an embodiment of a refrigerated transport unit with a transport refrigeration system (TRS) and a transport unit.

Embodiments of this disclosure relate to an integrated thermal energy module within the air-cooled evaporator design.

The integrated thermal energy module can be used for "hold-over" climate control capacity when, for example, a major power source of climate control is not available.

A major power source of, for example, a TRU can be a diesel engine, an alternator, a generator, a battery, solar cells, or the like. There are situations that the major power source of the TRU becomes unavailable. In such situations, an independent temporary "hold-over" climate control capacity may become desired to provide continuous climate control.

The term "flow control device" is hereby defined as one or more devices that control fluid flows in a refrigeration circuit of a refrigeration system, e.g., a TRS. In one embodiment, a flow control device can include one or more valves. For example, a flow control device may include one or more three-way valves. In another example, a flow control device may include one or more two-way valves.

The term "expansion device" is hereby defined as one or more expansion mechanisms that release the pressure of the heat transfer fluid in a refrigeration circuit, such that at least a part of the heat transfer fluid undergoes a phase change. In one embodiment, an expansion device is one or more expansion valves.

Use term "thermal accumulator" is hereby defined as one or more apparatuses that include phase change material (PCM). Further, the "thermal accumulator" allows the PCM to exchange heat with the environment near the thermal accumulator. In one embodiment, the PCM can be eutectic fluid, e.g., propylene glycol ($C_3H_8O_2$). In one embodiment, a thermal accumulator can include a refrigerant tube, such that the PCM can exchange heat with the refrigerant. In one embodiment, a thermal accumulator can include a refrigerant tube that has mechanisms to facilitate the heat-exchanging efficiency between the PCM and the refrigerant, e.g., a spine fin tube. In one embodiment, a thermal accumulator can include a tube that has mechanical mechanisms to enhance the heat exchange between the PCM and the ambient air near the thermal accumulator, e.g., the surface of an outer tube is mechanically patterned.

The term "thermal accumulator evaporator" is hereby defined as an evaporator in a refrigeration circuit that includes thermal accumulator as part of the heat exchanging process for the purpose of providing climate control. In one embodiment, air flow is forced through the thermal accumulator evaporator to provide climate control. In one embodiment, the thermal accumulator evaporator can be an outer tube that includes an inner tube, wherein the refrigerant flows in the inner tube and the PCM is stored in the space between the outer tube and inner tube. In one embodiment, the thermal accumulator evaporator can include a spine fin tube shown in FIG. 9.

The term "mode" of a transport refrigeration system that has at least one conventional evaporator and at least one thermal accumulator evaporator is hereby defined as that the flow control devices in the refrigeration circuit are set in a combination of on/off positions or any position between on and off (e.g., 50% open, a portion of a full flow, a variable flow, or the like) such that the heat transfer fluid, e.g. refrigerant, flows through the evaporators in a specific desired manner. The "conventional mode" means the flow control devices are set in on/off positions such that the heat transfer fluid, e.g., refrigerant, does not flow through the at least one thermal accumulator evaporator. The "thermal accumulator evaporator mode" means that the control devices are set in on off positions such that the heat transfer fluid, e.g. refrigerant, does not flow through the at least one conventional evaporator. The "parallel mode" means that the flow control devices are set in on/off positions such that the heat transfer fluid, e.g. refrigerant, flows through the at least one conventional evaporator and the at least one evaporator that includes a thermal accumulator in parallel. The "first series mode" means that the (low control devices fire set m on/off positions such that the heat transfer fluid, e.g., refrigerant, flows, first, through the at least one conventional evaporator and, second, through the at least one thermal accumulator evaporator in series. The "second series mode" means that the flow control devices are set in on off positions such that the heat transfer fluid, e.g., refrigerant, flows, first, through the at least one thermal accumulator evaporator, and, second, through the conventional evaporator in series.

The term "upstream of" is hereby defined. The term "upstream of" means relative locations of two elements in a refrigeration circuit such that, for example, element A is disposed "upstream of" element B means the heat transfer fluid in the refrigeration circuit flows from element A to element B.

The term "downstream of" is hereby defined. The term "downstream of" means relative locations of two elements in a refrigeration circuit such that, for example, element B is disposed "downstream of" element A means the heat transfer fluid in the refrigeration circuit flows from element A to element B.

The embodiments disclosed herein relate to apparatuses, systems, and methods with "hold-over" climate control capacity. The term "hold-over" means a temporary climate control capacity provided when the major power source of refrigeration is not available. The term "climate control" refers to cooling and/or heating. It should be noted that the hold-over climate control capacity can be used for cooling and/or heating.

Major power source of a TRS can be a diesel engine, an alternator, a generator, a battery, solar cells, or the like. There are situations that the major power source of the TRS becomes unavailable and a temporary "hold-over" climate control capacity becomes desired. Such situations may include, but is not limited to, a tractor delivering perishable produces that needs to make intermittent stops, a tractor that travels through a noise regulated zoning area so that the genset for refrigeration has to be turned off in compliance, school bus that makes intermittent stops to allow students to get on and off, a handicap transportation vehicle that makes intermittent stops, an airplane that idols on the apron, a cruise line waiting in a harbor, or the like.

It is noted that the embodiments disclosed herein can be applied to any situation in which a temporary hold-over climate control capacity is desired. That is, the embodiments disclosed herein can be applied to any mobile transport application, such as a truck, a bus, a passenger car, a handicap vehicle, an airplane, a ship, a cruise ship, a rail car, a passenger vessel, and the like. The embodiments disclosed herein can also be applied to non-transport TO applications, such as a commercial or residential structure. This can include a building, and a shopping center, a residential building, an apartment, a single family home, an office building, a sports arena, a hospital, a school, and the like.

In one example, a TRS is powered by a diesel engine of a tractor. When the diesel engine of the tractor is turned off due to intermittent stops, the TRS lose its major power source for the climate control. In such situation, a temporary "hold-over" source of climate control becomes desired to keep the interior space of a transport unit, e.g., a trailer, at a desired temperature before the diesel engine of the tractor can be turned back on. In one embodiment, the hold-over climate control capacity may be provided by creating an air flow through a thermal accumulator evaporator, wherein the thermal accumulator evaporator has PCM that is below its phase change temperature, e.g., freezing point. Applications that may desire such hold-over climate control capacity may further include, but is not limited to, transporting perishable produce, goods, pharmaceuticals, animals, or the like. Further, applications may include vehicles that need to make intermittent stops, e.g., public bus, school bus, taxi, passenger cars, handicap transportation vehicle, or the like. Applications may also include massive transportation vehicles, e.g. air planes, passenger vessels, cruise lines, light rail trains, railroad trains, or the like.

FIG. 1 illustrates an embodiment of a refrigerated transport unit 100 with a transport refrigeration system (TRS) 105 and a transport unit 110. While the refrigerated transport unit 100 is directed to a refrigerated truck, it will be appreciated that the embodiments discussed herein can be directed to other types of refrigerated transport units. Examples of other refrigerated transport units include, but are not limited to, a trailer unit that can be attached to a tractor, a ship board container, an air cargo container or cabin, an over the road truck cabin, or the like. As shown in FIG. 1, the refrigerated transport unit 100 is pulled by a tractor 115. The TRS 105 includes a refrigeration circuit (not shown) that provides climate control of an interior space 120 of the transport unit 110. In one embodiment, the refrigeration circuit (not shown) can be the refrigeration circuit 200 shown in FIG. 2. The interior space 120 may be used to store cargo such as, for example, perishable goods or produce that require climate control during transportation. The TRS 105 includes a transport refrigeration unit (TRU) 125 that is mounted on a front wall 130 of the transport unit 110 and extends partially over the top of the tractor 115. The TRU 125 includes at least a portion of the refrigeration circuit of the TRS 105. The TRU 125 can also include a power source (e.g., a TRU engine, one or more batteries, an alternator, etc.) (not shown) for providing power for the TRS 105 (including a compressor of the refrigeration circuit), a control system (e.g., a TRS controller) (not shown) for controlling the TRS 105 (including the refrigeration circuit), and one or more fans (e.g., condenser fan(s), evaporator fan(s), etc.). In some embodiments, the TRU 125 can include the entire refrigeration circuit.

It is noted, the mounting configuration of a TRU 125 in tins disclosure is not limited to the embodiment of FIG. 1 and other mounting configurations may be applied. For example, the TRU 125 can be mounted on one or more other sides, a top, and/or a bottom of the transport unit 110 to provide climate control to the interior space 120. As shown in FIG. 1, the heightwise direction is labeled along a height direction of the transport unit 110 and the lengthwise direction is labeled along a length direction of the transport unit 110.

Figure 2:
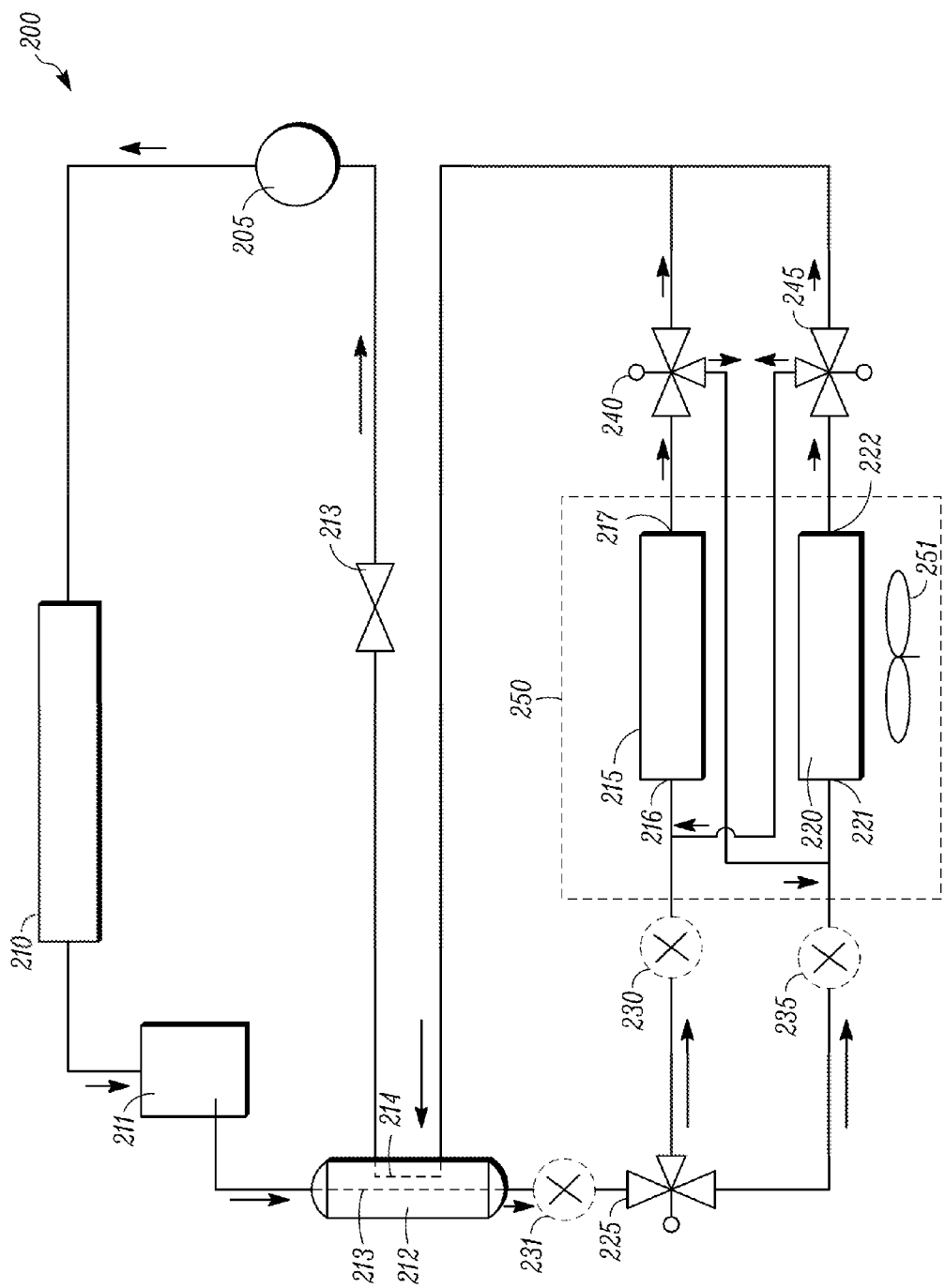
FIG. 2 illustrates an embodiment of a refrigeration circuit that can be included, for example, in the TRS shown in FIG. 1.

FIG. 2 illustrates an embodiment of a refrigeration circuit 200 that can be included, for example, in the TRS 105 shown in FIG. 1. Every element in the refrigeration circuit 200 is fluidically connected to each other. The refrigeration circuit 200 includes a compressor 205, a condenser 210, a receiver tank 211, a suction-liquid heat exchanger 212, a fourth flow control device 213, a conventional evaporator 215, a thermal accumulator evaporator 220, a first flow control device 225, a second flow control device 240, a third flow control device, a first expansion device 230, a second expansion device 235, a third expansion device 231, an air discharge unit 250, and an air blower 251.

In some embodiments, the first expansion device 230 and the second expansion device 235 can be replaced with an optional third expansion device 231 disposed upstream of the first flow control device 225. In one embodiment, the refrigerant circuit 200 may include a mechanical thermal expansion valve as the first expansion device 230 and another mechanical thermal expansion valve as the second expansion device 235. In this embodiment, the third expansion device 231 is not required. In another embodiment, the refrigerant circuit 200 may include an electronic expansion valve as the third expansion device 231. In this embodiment the first expansion device 230 and the second expansion device are not required. It will be appreciated that either of the first expansion device 230 and the second expansion device can be a mechanical expansion device, an electronic expansion device, etc.

Arrows in FIG. 2 are provided to indicate examples of possible flow directions of a heat transfer fluid within the refrigeration circuit 200. The heat transfer fluid can include, for example, refrigerant. It should be appreciated that any refrigerant suitable for the inventive purposes of the embodiments disclosed herein can be used. In some embodiments, the refrigerant suitable for the inventive purposes may include, but is not limited to, R404A, R134A, and R452A.

An evaporator is air heat exchanger that allows heat transfer fluid, e.g., refrigerant, to exchange heat with an air flow. The term "conventional evaporator" used in this disclosure refers to an evaporator that does not include a thermal accumulator in the heat exchanging process. In one embodiment, a conventional evaporator includes a plurality of cooper, aluminum, and/or other metal tubes wherein relatively cold refrigerant flows inside of the tubes and relatively hot air are forced through the outside surface of the tubes. In one embodiment, the conventional evaporator 215 can include a fin-and-tube heat exchanges, a microchannel evaporator, or the like. In other embodiments, the conventional evaporator 215 can be the conventional evaporator 310 (as shown in FIG. 3), 430 (as shown in FIG. 4), 525 (as shown in FIG. 5), 670 (as shown in FIG. 6), 675 (as shown in FIG. 6), 740 (as shown in FIG. 7) and/or 830 (as shown in FIG. 8).

Figure 9A:
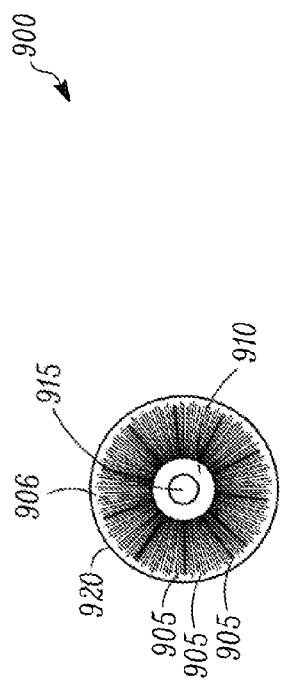
FIGS. 9A and 9B illustrate different views of a spine fin tube that can be used, for example, as one of the plurality of thermal accumulator evaporators shown in FIGS. 3A-8C.
Figure 9B:
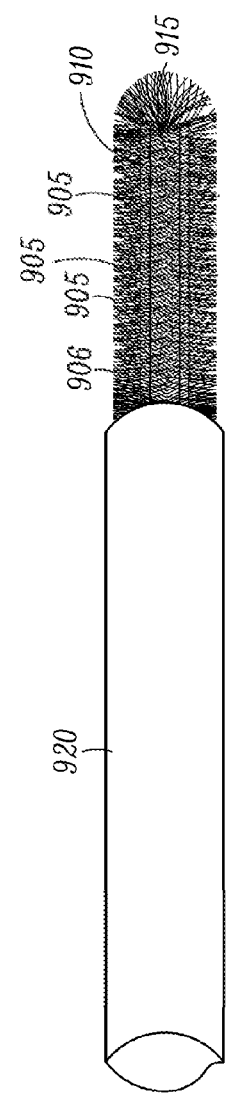

On the other hand, the term "thermal accumulator evaporator," as defined previously, refers to an evaporator that includes a thermal accumulator as part of the heat exchanging process. In one embodiment, the thermal accumulator evaporator 215 includes a plurality of spine fin tubes 900 (as shown in FIGS. 9A and 9B).

In another embodiment, the thermal accumulator evaporator 215 may be a shell-and-tube evaporator, which includes an inner tube and an outer shell, wherein the inner tube may include one or more finned protrusions configured to facilitate heat-exchange between the fluid disposed inside of the inner tube and the fluid disposed in the space between the inner tube and the outer shell, in another embodiment, the shell-and-tube design of thermal accumulator evaporator may include multiple inner tubes disposed in one outer shell, configured to facilitate the heat-exchange process it should be appreciated that the size, the shape, the pattern, and/or the manufacturing process of a shell-and-tube evaporator is generally known in the art. Accordingly, the size, shape, pattern and/or manufacturing process of the shell-and-tube heat exchanger can be designed to meet the requirements of the particular system in which it is used.

In other embodiments, the thermal accumulator evaporator 215 can be the thermal accumulator evaporator 305 (as shown in FIG. 3), 435 (as shown in FIG. 4), 520 (as shown in FIG. 5), 660 (as shown in FIG. 6), 665 (as shown in FIG. 6), 735 (as shown in FIG. 7), and 835 (as shown in FIG. 8).

The compressor 205 is configured to compress a heat transfer fluid in the refrigeration circuit 200. The condenser 210 is disposed downstream of the compressor 205 and is configured to allow heat exchange between a relatively hot heat transfer fluid and a relatively cooler ambient air. The receiver tank 211 is disposed downstream of the condenser 210 to receive the heat transfer fluid. The suction-liquid heat exchanger 212 is disposed downstream of the receiver tank 211 and downstream of the evaporators 215, 220 and is configured to perform a heat exchange between a relatively hot heat transfer fluid from the receiver tank 211 and a relatively cooler heat transfer fluid from the evaporators 215, 220. The first flow control device 225 is disposed downstream of the suction-liquid heat exchanger 212 and is configured to regulate a flow of a heat transfer fluid from the suction-liquid heat exchanger 212 to the conventional evaporator 215 and/or the thermal accumulator evaporator 220. The first flow control device 225, e.g., a three-way valve, can direct the heat transfer fluid to the conventional evaporator 215 alone, the thermal accumulator evaporator 220 alone, both of the conventional evaporator 215 and thermal accumulator evaporator 220, or none of them.

In a first alternative embodiment, the refrigeration circuit 200 includes the first expansion device 230 and the second expansion device 235 both disposed downstream of the first flow control device 225 and are configured to release pressure of the heat transfer fluid from the suction-liquid heat exchanger 212, such that at least a portion of the heat transfer fluid undergoes a phase change. The first expansion device 230 releases the pressure of the heat transfer fluid flowing from the first flow control device 225 to the conventional evaporator 215. The second expansion device 220 releases the pressure of the heat transfer fluid flowing from the first flow control device 225 to the thermal accumulator evaporator 220. In a second alternative embodiment, the refrigeration circuit 200 includes the third expansion device 231 (instead of the first 230 and the second 235 expansion device) disposed downstream of the suction-liquid heat exchanger 212 and upstream of the first flow control device 225. In the second alternative embodiment the first flow control device 225 regulates the flow of the heat transfer fluid from the third expansion device 231 to the conventional evaporator 215 alone, the thermal accumulator evaporator 220 alone, both of the conventional evaporator 215 and thermal accumulator evaporator 200, or none of them.

The conventional evaporator 215 is disposed downstream of the first expansion device 230 (if applicable) and configured to perform a heat exchange between a relatively colder heat transfer fluid and a relatively hotter air blown by the air blower 251. The second flow control device 240 is disposed downstream of the conventional evaporator 215 and upstream of the second expansion device 235. The second flow control device 240 is configured to regulate a flow of the heat transfer fluid from the conventional evaporator 215 to the suction-liquid heat exchanger 112 and/or to the thermal accumulator evaporator 220. The thermal accumulator evaporator 220 is disposed downstream of the second expansion device 255 (if applicable) and the second flow control device 240. The thermal accumulator evaporator 220 is configured to perform a heat exchange between a relatively colder heat transfer fluid from the conventional evaporator 215 (through the second flow control device 240) and/or the suction-liquid heat exchanger 212 (through the first flow control device 225).

The air blower 251 generates a flow of air through the conventional evaporator 215 and/or the thermal accumulator evaporator 220 to facilitate the heat exchanging process. The air blower 251 may be, in other embodiments, the air blower 330 (as shown in FIG. 3), 410 (as shown in FIG. 4), 411 (as shown in FIG. 4), 510 (as shown in FIG. 5), 610 (as shown in FIG. 6), 710 (as shown in FIG. 7), and 810 (as shown in FIG. 8).

The fourth flow control device 213 is disposed downstream of the suction-liquid heat exchanger 212 and is configured to regulate a flow of the heat transfer fluid from the suction-liquid heat exchanger 212 to the compressor 205. The compressor 205 is disposed downstream of the fourth flow control device 213 configured to compress the relatively lower pressure heat, transfer fluid from the suction-liquid heat exchanger 212 to a relatively higher pressure heat transfer fluid.

The refrigeration circuit 200 can be controlled to operate in a conventional evaporator mode, an integrated evaporator mode, a parallel mode, a first series mode, and a second series mode.

In the conventional evaporator mode, the heat transfer fluid does not flow through the thermal accumulator evaporator 220. In the conventional evaporator mode, the first flow control device 225 can be set in a position to allow a fluid flow from the suction-liquid heat exchanger 212 to the conventional evaporator 215, but does not allow the fluid from the suction-liquid heat exchanger 212 to the thermal accumulator evaporator 220. The second flow control device 240 can be set in a position to allow a fluid flow from the conventional evaporator 215 to the suction-liquid heat exchanger 212, but does not allow the fluid from the conventional evaporator 215 to the thermal accumulator evaporator 220. The third flow control device 245 can be set in a position to stop flows from all directions.

In the thermal accumulator evaporator mode, the heat transfer fluid does not flow-through conventional evaporator 215. In the thermal accumulator evaporator mode, the first flow control device 225 can be set in a position to allow a fluid flow from the suction-liquid heat exchanger 212 to the thermal accumulator evaporator 220, but does not allow the fluid from the suction-liquid heat exchanger 212 to the conventional evaporator 215. The third flow control device 245 can be set in a position to allow a fluid flow from the thermal accumulator evaporator 220 to the suction-liquid heat exchange 212, but does not allow the fluid flow from the thermal accumulator evaporator 220 to the conventional evaporator 215. The second flow control device 240 can be set in a position to stop flows from all directions.

In the parallel mode, the heat transfer fluid flows through conventional evaporator 215 and the thermal accumulator evaporator 220 in parallel. In the parallel mode, the first flow control device 225 can be set in a position to allow both a fluid flow from the suction-liquid heat exchanger 212 to the thermal accumulator evaporator 220, and the fluid from the suction-liquid heat exchanger 212 to the conventional evaporator 215. The second flow-control device 240 can be set in a position to allow fluid flow from the conventional evaporator 215 to the suction-liquid heat exchanger 212, but does not allow fluid flow from the conventional evaporator 215 to the thermal accumulator evaporator 220. The third flow control device 245 cart be set in a position to allow a fluid flow from the thermal accumulator evaporator 220 to the suction-liquid heat exchanger 212, but does not allow the fluid flow from the thermal accumulator evaporator 220 to the conventional evaporator 215.

In the first series mode, the heat transfer fluid flows to the conventional evaporator 215 first and then the thermal accumulator evaporator 220 second. In the first series mode, the first flow control device 225 can be set in a position to allow a fluid flow from a first path 213 of the suction-liquid heat exchanger 212 to an inlet 216 of the conventional evaporator 215, but does not allow the fluid flow from the first path 213 of the suction-liquid heat exchanger 212 to an inlet 221 of the thermal accumulator evaporator 220. The second flow control device 240 can be set in a position to allow fluid flow from an outlet 217 of the conventional evaporator 215 to the inlet 221 of the thermal accumulator evaporator 220, but does not allow fluid flow from the outlet 217 of the conventional evaporator 215 to a second path 214 of the suction-liquid heat exchanger 212. The third flow control device 245 can be set in a position to allow a fluid flow from an outlet 222 of the thermal accumulator evaporator 220 to the second path 214 of the suction-liquid heat exchanger 212, but does not allow the fluid flow from the outlet 222 of the thermal accumulator evaporator 220 back to the inlet 210 of the conventional evaporator 215.

In the second series mode, the heat transfer fluid flows to the thermal accumulator evaporator 220 first and then the conventional evaporator 215 second. In the second series mode, the first flow control device 225 can be set in a position to allow a fluid flow from the first path 213 of the suction-liquid heat exchanger 212 to the inlet 221 of the thermal accumulator evaporator 220, but does not allow the fluid flow from the first path 213 of the suction-liquid heat exchanger 212 to the inlet 216 of the conventional evaporator 215. The second flow control device 240 can be set in a position to allow fluid flow from the outlet 217 of the conventional evaporator 215 to the second path 214 of the suction-liquid heat exchanger 212, but does not allow fluid flow from the outlet 217 of the conventional evaporator 215 to the inlet 221 of the thermal accumulator evaporator 220. The third flow control device 245 can be set in a position to allow a fluid flow from the outlet 222 of the thermal accumulator evaporator 220 to the inlet 216 of the conventional evaporator 215, but does not allow the fluid flow from the outlet 222 of the thermal accumulator evaporator 220 to the second path 214 of the suction-liquid heat exchanger 212.

In some embodiments, the refrigeration circuit 200 can include a heating mechanism (e.g., a heater) (not shown) for heating being discharged into the internal space. For example, when the thermal accumulator evaporator uses a PCM material to condition air in the interior space to a frozen temperature range (e.g., about −5° C. to about +5° C., the heating mechanism can be used to warm air being discharged into the internal space to achieve a target temperature in the interior space that is greater than the frozen temperature range.

It is noted that the refrigeration circuit 200 can be applied to many applications, without limitation, that desire a temporary hold-over climate control capacity. In some embodiments, the refrigeration circuit 200 can be used in transport applications, such as a truck, a bus, a passenger car, a handicap vehicle, an airplane, a ship, a cruise line ship, a rail car, a passenger vessel, or the like. In some other embodiments, the refrigeration circuit 200 can be used in non-transport applications, such as a residential building, an apartment, an office building, a shopping center, a sports arena, a hospital, a school, and the like.

It is noted that the air discharge units 300, 400, 500, 600, 700 and 800 described in FIGS. 3A-8C can be retrofitted to an existing refrigeration circuit, e.g. the refrigeration circuit 200. In one embodiment, the TRU 125 may include an existing air discharge unit and the air discharge units 300, 400, 500, 600, 700 and 800 described in FIGS. 3A-8C may be retrofitted to the TRU 125 to replace the existing air discharge unit. In one retrofitting example, the TRU 125 may include an air discharge unit that has a first housing with a conventional evaporator. A separate second housing with a thermal accumulator evaporator may be retrofitted to an existing refrigeration circuit of the TRU 125. In this retrofitting example, after being retrofitted, the refrigeration circuit of the TRU 125 may include both a conventional evaporator and a thermal accumulator evaporator, e.g., the refrigeration circuit 200.

FIG. 3 illustrates side views of an air discharge unit 300 that includes a thermal accumulator evaporator 305, and a conventional evaporator 310 arranged in a heightwise direction, according to one embodiment. In one embodiment, the air discharge unit 300 may be used, for example, as part of the TRU 125 shown in FIG. 1. In another embodiment, the air discharge unit 300 can be used, for example, as the air discharge unit 250 shown in FIG. 2, wherein the thermal accumulator evaporator 305 can be the thermal accumulator evaporator 220, the conventional evaporator 310 can be the conventional evaporator 215, and the air blower 330 can be the air blower 251. The heightwise and lengthwise directions are labeled by the arrows in FIG. 3. In this embodiment, the thermal accumulator evaporator 305 is disposed in a higher section 301 of the housing 335 in the heightwise direction and the conventional evaporator 310 is disposed in a lower section 302 of the housing 335 in the heightwise direction. It is noted that the orientation of the thermal accumulator evaporator 305 and the conventional evaporator 310 is not limited to FIG. 3. In one embodiment, the thermal accumulator evaporator 305 can be disposed m the lower section 302 and conventional evaporator 310 in the higher section 301 of the housing 335. It should be understood that the housing 335 of the air discharge unit 300 may include other components in a TRS not shown in FIG. 3, e.g., battery, sensor, controller, genset, flow control device, expansion device, or the like.

It should also be appreciated that the air blower 330 ma remain fully functional when the primary power source of climate control is not available. In one embodiment, the air blower 330 may be powered by an independent battery, a solar cell, an independent generator, or the like. In one embodiment, the air blower 330 can be a secondary separate blower from the primary blower for the conventional evaporator 310.

In one embodiment, as shown in FIG. 3, the thermal accumulator evaporator 305 includes an inner tube portion 306 and a thermal accumulator portion 307. In one embodiment, the thermal accumulator evaporator 305 includes the inner tube and an outer tube, wherein the heat exchange fluid flows inside of the inner tube (the inner tube portion 306) and PCM is stored in the space between the inner tube and the outer tube (the thermal accumulator portion 307). The thermal accumulator evaporator 305 is configured to provide the hold-over climate control capacity. Details of one embodiment of a thermal accumulator evaporator are shown in FIGS. 9A-B.

The conventional evaporator 310 may include one or more heat exchangers, in one embodiment, the conventional evaporator 310 may include a plurality of metal rubes as heat exchangers, wherein a heat transfer fluid, e.g., refrigerant, flows inside of the tube, and an air flow is forced through outside surfaces of the metal tubes.

Figure 3A:
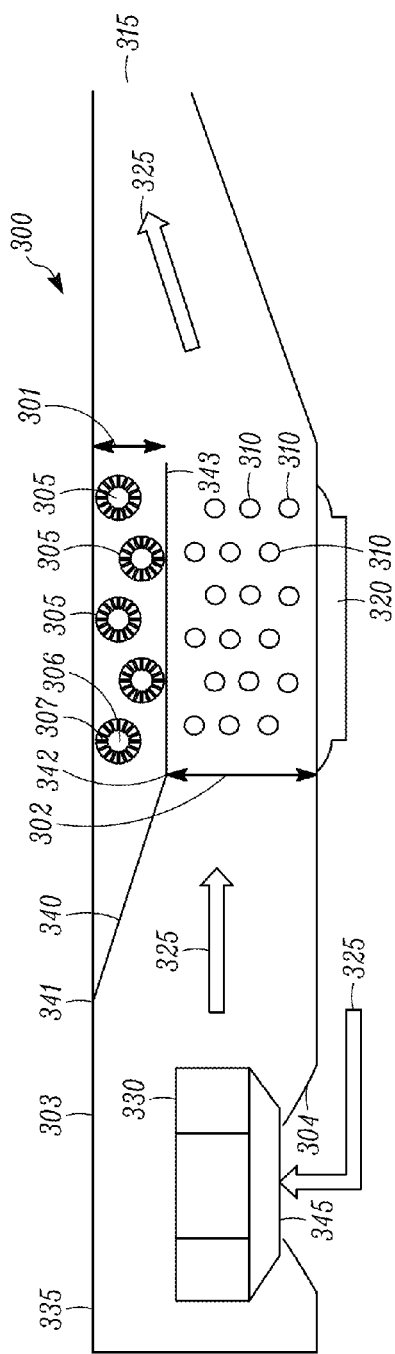
FIGS. 3A and 3B illustrate side views of an air discharge unit that includes a thermal accumulator evaporator and a conventional evaporator arranged in a heightwise direction, according to one embodiment.
Figure 3B:
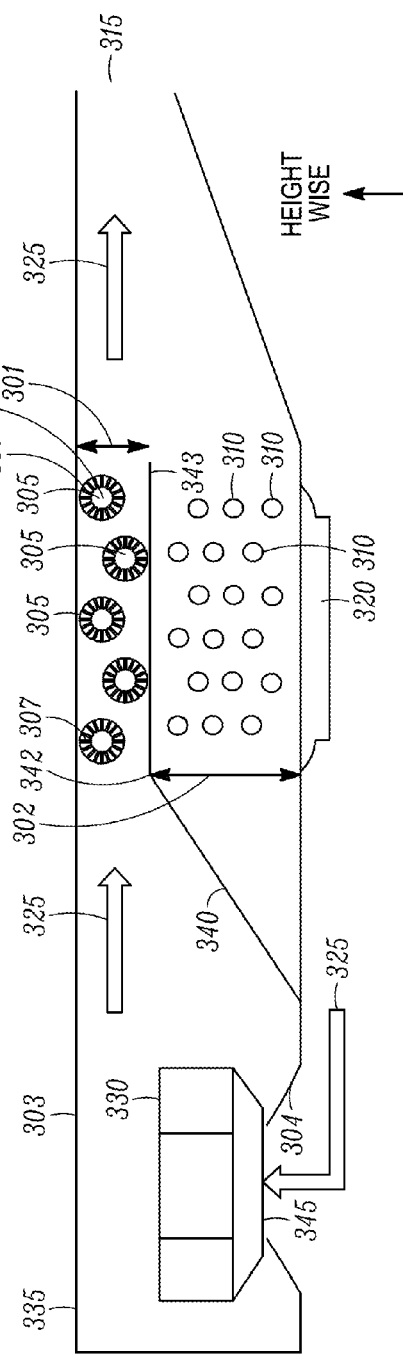

As shown in FIGS. 3A and 3B, the air discharge unit 300 includes a housing 335. The housing 335 includes an air intake port 345, an air discharge port 315, an air blower 330 configured to create an air flow 325, in which air is sucked into the housing 335 via the air blower 330 and blown through one or both of the thermal accumulator evaporator 305 and the conventional evaporator 310 to the air discharge port 315.

The air discharge unit 300 further includes a damper 340 that is configured to change the direction of the air flow 325 by changing its position, for example, through an actuator such as a motor and/or a spring. The damper 340 has a first end 341 and a second end 342. The second end 342 attaches to a separation plate 343. In one embodiment, as shown in FIG. 3A, the first end 341 of the damper 340 attaches to the top wall 303 of the housing 335. In the embodiment of FIG. 3A, a majority of the air flows through the conventional evaporator 310. In another embodiment, as shown in FIG. 3B, the first end 341 of the damper 340 attaches to the bottom wall 304 of the housing 335. In yet another embodiment, the first end 341 of the damper 340 may be in a position that allows X % of air flow 325 to flow through the thermal accumulator evaporator 305 and (100−X)% of air flow 325 to flow through the conventional evaporator 310, wherein X=0~100.

The air discharge unit 300 further includes a dripping pan 320 configured to collect condensation drippings of at least one of the thermal accumulator evaporator 305 and the conventional evaporator 310.

The air discharge unit 300 may further include a heater (not shown) configure to defrost the thermal accumulator evaporator 305.

The damper 340 shown in FIG. 3A and FIG. 3B can be controlled, for example, by a control system to change position in order to change the direction of the air flow 325. In FIG. 3A, the damper 340 is in a first position that is in contact with a top wall 303 of the housing 335 in order to direct the majority of the air flow 325 through the conventional evaporator 310. In FIG. 3B, the damper 340 is in a second position that is in contact with a bottom wall 304 of the housing 335 in order to direct the majority of the air flow 325 through the thermal accumulator evaporator portion 305. The term "majority" as used herein can means more than about 50% to 100%. It will be appreciated that in some embodiments the damper 340 can be disposed between the top wall 303 and the bottom wall 304.

In one embodiment, the position of the damper 340 can be changed by an actuator, e.g., a motor, a spring, or the like, wherein the actuator may be further controlled by a controller that receives instructions, e.g. sensor signals, computer instructions, etc. The position of the damper 340 can also be changed passively by the an pressure difference created by the air flow 325. It is noted, there is no limitation on how the damper can be controlled. Any active or passive method known in the an can be applied in the embodiments disclosed in this disclosure.

The embodiments shown in FIGS. 3A and 3B have the advantages of requiring only one air blower, providing full utilization of the blower for both the conventional evaporator and the thermal accumulator evaporator. Advantages further include being in compact size, utilizing of half height of the housing for thermal accumulator evaporator and the other half height for conventional evaporator.

FIG. 4A illustrates a side view of a conventional evaporator air discharge unit 400 with a conventional evaporator 430 arranged in a housing 405. FIG. 4B illustrates a side view of a thermal accumulator evaporator air discharge unit 401 with a thermal accumulator evaporator 435 arranged in a housing 406. In some embodiments, the air discharge units 400, 401 may be used, for example, as part of the TRU 125 shown in FIG. 1. In some embodiments, the air discharge units 400, 401 can be used, for example, as the air discharge unit 250 shown in FIG. 2, wherein the thermal accumulator evaporator 435 can be the thermal accumulator evaporator 220, the conventional evaporator 430 can be the conventional evaporator 215, and the air blowers 410, 411 can be the air blower 251. The heightwise and lengthwise directions are labeled by the arrows in FIGS. 4A and 4B.

It should be understood that the housings 405, 406 of the air discharge units 400, 401 may include other components in a TRS not shown in FIGS. 4A and 4B, e.g., battery, sensor, controller, genset, flow control device, expansion device, or the like.

It should also be appreciated that the air blowers 410, 411 may remain fully functional when the primary power source of climate control is not available. In one embodiment, the air blowers 410, 411 may be powered by an independent battery, a solar cell, an independent generator, or the like.

In one embodiment, as shown in FIG. 4B, the thermal accumulator evaporator 435 includes an inner tube portion 436 and a thermal accumulator portion 437. In one embodiment, PCM is stored in the space between the inner tube and the outer tube (the thermal accumulator portion 437). The thermal accumulator evaporator 435 is configured to provide the hold-over climate control capacity. Details of one embodiment of a thermal accumulator evaporator are shown in FIGS. 9A-B.

The conventional evaporator 430 may include one or more heat exchangers. In one embodiment, the conventional evaporator 430 may include a plurality of metal tubes as heat exchangers, wherein a heat transfer fluid, e.g., refrigerant flows inside of the tube, and an air flow is forced through outside surfaces of the metal tubes.

As shown in FIG. 4A, the air discharge unit 400 includes the housing 405. The housing 405 includes an air intake port 415, an air discharge port 420, an air blower 410 configured to create an air flow 425, in which air is sucked into the housing 405 via the air blower 410 and blown through the conventional evaporator 430 to the air discharge port 420. The air discharge unit 400 further includes a dripping pan 440 configured to collect condensation drippings of the conventional evaporator 430.

As shown in FIG. 4B, the air discharge unit 401 includes the housing 406. The housing 406 includes an air intake port 416, an air discharge port 421, an air blower 411 configured to create an air flow 426, in which air is sucked into the housing 406 via the air blower 411 and blown through the thermal accumulator evaporator 435 to the air discharge port 421. The air discharge unit 400 further includes a dripping pan 441 configured to collect, condensation drippings of the thermal accumulator evaporator 435.

The air discharge unit 401 may further include a heater (not shown) configure to defrost the thermal accumulator evaporator 430.

The embodiments shown in FIGS. 4A and 4B have the advantages of reduced height of the air discharge unit, which may be useful for a transport unit that desires maximum storage space. The embodiments shown in FIGS. 4A and 4B further include the advantages of potentially maximizing the hold-over capacity of the thermal accumulator evaporator.

FIG. 5 illustrates a top view of an embodiment of an air discharge unit 500, wherein the conventional evaporator 525 and the thermal accumulator evaporator 520 are arranged in a widthwise direction. In one embodiment the air discharge unit 500 can be a part of the TRU 525 in FIG. 1. In another embodiment, the air discharge unit 500 can be used, for example, as the air discharge unit 250 shown in FIG. 2, wherein the thermal accumulator evaporator 520 can be the thermal accumulator evaporator 220, the conventional evaporator 525 can be the conventional evaporator 215, and the air blower 510 can be the air blower 251. The widthwise and lengthwise directions are labeled by the arrows in FIG. 5.

In this embodiment, the thermal accumulator evaporator 20 is disposed in a left side section 501 (looking from the air blower 510 to the air discharge 535 of the housing 505 in the widthwise direction and the conventional evaporator 525 is disposed in a right side section 502 of the housing 505 in the widthwise direction. It is noted that the orientation of the thermal accumulator evaporator 520 and the conventional evaporator 525 is not limited to FIG. 5. In one embodiment the thermal accumulator evaporator 520 can be disposed in the right side section 502 and conventional evaporator 525 in the left side section 501 of the housing 505. It should be understood that the housing 505 of the air discharge unit 500 may include other components in a TRS not shown in FIG. 5, e.g., battery, sensor, controller, genset, flow control device, expansion device, or the like.

It should also be appreciated that the air blower 510 may remain fully functional when the primary power source of climate control is not available. In one embodiment, the air blower 510 may be powered by an independent battery, a solar cell, an independent generator, or the like. In one embodiment, the air blower 510 can be a secondary separate blower from the primary blower for the conventional evaporator 520.

In one embodiment, the thermal accumulator evaporator 520 may include an inner tube portion (not shown) and a thermal accumulator portion (not shown). In one embodiment, the thermal accumulator evaporator 520 may include an inner tube and an outer tube, wherein the heat exchange fluid flows inside of the inner tube (the inner tube portion) and PCM is stored in the space between the inner tube and the outer tube (the thermal accumulator portion). The thermal accumulator evaporator 520 is configured to provide the hold-over climate control capacity. Details of one embodiment of a thermal accumulator are shown in FIGS. 9A-B.

The conventional evaporator 525 may include one or more heat exchangers, in one embodiment, the conventional evaporator 525 may include a plurality of metal rubes as heat exchangers, wherein a heat transfer fluid, e.g., refrigerant, flows inside of the tube, and an air flow is forced through outside surfaces of the metal tubes.

As shown in FIGS. 5A and 5B, the air discharge unit 500 includes a housing 505. The housing 505 includes an air intake port (not shown), an air discharge port 535, an air blower 510 configured to create an air flow 515, in which air is sucked into the housing 505 via the air blower 510 and blown through one or both of the thermal accumulator evaporator 520 and the conventional evaporator 525 to the air discharge port 535.

The air discharge unit 500 further includes a damper 530 that is configured to change the direction of the air flow 515 by changing its position. The damper 340 has a first end 53 and a second end 532. The second end 532 attaches to a separation plate 533. In one embodiment, as shown in FIG. 3A, the first end 531 of the damper 530 attaches to the left wall 503 of the housing 505. In the embodiment of FIG. 5A, a majority of the air flows through the conventional evaporator 525. In another embodiment, as shown in FIG. 5B, the first end 531 of the damper 530 attaches to the right wall 504 of the housing 505. In yet another embodiment, the first end 531 of the damper 530 may be in a position that allows X % of air flow 515 to flow through the thermal accumulator evaporator 520 and (100–X)% of air flow 525 to flow through the conventional evaporator 525, wherein X=0~100.

The air discharge unit 500 further includes a dripping pan (not shown) configured to collect condensation drippings of at least one of the thermal accumulator evaporator 520 and the conventional evaporator 525.

The air discharge unit 500 may further include a heater (not shown) configure to defrost the thermal accumulator evaporator 520.

The damper 530 shown in FIG. 5A and FIG. 5B can be controlled, for example, by a control system to change its position in order to change the direction of the air flow 515. In FIG. 5A, the damper 530 is in a first position that the first end 531 is in contact with a left wall 503 of the housing 505 in order to direct the majority of the air flow 515 through the conventional evaporator 525. In FIG. 5B, the damper 530 is in a second position that the first end 531 is in contact with a right wall 504 of the housing 505 in order to direct the majority of the air flow 515 through the thermal accumulator evaporator 520. The term "majority" as used herein can means more than about 50% to 100%. It will be appreciated that in some embodiments the damper 530 can be disposed between the left wall 503 and the right wall 504.

In one embodiment, the position of the damper 530 can be changed by an actuator, e.g., a motor, a spring, or the like, wherein the actuator may be further controlled by a controller that receives instructions, e.g. sensor signals, computer instructions, etc. The position of the damper 530 can also be changed passively by the air pressure difference created by the air flow 515. It is noted, there is no limitation on how the damper can be controlled. Any active or passive method known in the art can be applied in the embodiments disclosed in this disclosure.

The embodiments shown in FIGS. 5A and 5B have the advantages of requiring only one air blower, providing full utilization of the blower for both the conventional evaporator and the thermal accumulator evaporator. Advantages further include being in a compact size, utilizing half width of the housing for thermal accumulator evaporator and the other half width for conventional evaporator.

FIG. 6 illustrates a side view of art embodiment of an air discharge unit 600 with two conventional evaporators 670, 675 and two thermal accumulator evaporators 660, 665 arranged in a height wise direction. The thermal accumulator evaporator 660 and the conventional evaporator 670 are arranged in a heightwise direction at a first end 633 of the air discharge unit 600. The thermal accumulator evaporator 665 and the conventional evaporator 675 are arranged in a heightwise direction at a second end 634 of the air discharge unit 600.

In one embodiment, the air discharge unit 600 may be used, for example, as part of the TRU 125 shown in FIG. 1. In another embodiment, the air discharge unit 600 can be used, for example, as the air discharge unit 250 shown in FIG. 2, wherein the thermal accumulator evaporators 660, 665 can be the thermal accumulator evaporator 220, the conventional evaporator 670 can be the conventional evaporator 215, and the air blower 615 can be the air blower 251. The heightwise and lengthwise directions are labeled by the arrows in FIG. 6. In this embodiment, the thermal accumulator evaporators 660, 665 are disposed in a higher section 631 of the housing 605 in the heightwise direction and the conventional evaporators 670, 675 are disposed in a lower section 632 of the housing 605 in the heightwise direction. It is noted that the orientation of the thermal accumulator evaporators 660, 665 and the conventional evaporators 670, 675 are not limited to FIG. 6. In one embodiment, the thermal accumulator evaporators 600, 665 can be disposed in the lower section 632 and conventional evaporators 670, 675 can be disposed in the higher section 631 of the housing 605. It should be understood that the housing 605 of the air discharge unit 600 may include other components in a TRS not shown in FIG. 6, e.g., battery, sensor, controller, genset, flow control device, expansion device, or the like.

It should also be appreciated that the air blower 610 may remain fully functional when the primary power source of climate control is not available. In one embodiment, the air blower 610 may be powered by an independent battery, a solar cell, an independent generator, or the like. In one embodiment, the air blower 610 can be a secondary separate blower from the primary blower for the conventional evaporators 670, 675.

In one embodiment, the thermal accumulator evaporators 660, 665 may include an inner tube portion and a thermal accumulator portion. In one embodiment, the thermal accumulator evaporators 660, 665 may include an inner tube and an outer tube, wherein the heat exchange fluid flows inside of the inner tube and PCM is stored in the space between the inner tube and the outer tube. The thermal accumulator evaporators 660, 665 are configured to provide the hold-over climate control capacity. Details of one embodiment of a thermal accumulator evaporator are shown in FIGS. 9A-B.

The conventional evaporators 670, 675 may include one or more heat exchangers. In one embodiment, the conventional evaporators 670, 675 may include a plurality of metal tubes as heat exchangers, wherein a heat transfer fluid, e.g., refrigerant, flows inside of the tube, and an air flow is forced through outside surfaces of the metal tubes.

As shown in FIGS. 6A and 6B, the air discharge unit 600 includes a housing 605. The housing 605 includes an air intake port 615, a first air discharge port 625 at the first end 633, a second air discharge port 620 at the second end 634, an air blower 615 configured to create air flows 630, 635, in which air is sucked into the housing 605 via the air blower 615. The air flow 630 is blown through one or both of the thermal accumulator evaporators 660 and the conventional evaporator 670 to the first air discharge port 625. The air flow 635 is blown through one or both of the thermal accumulator evaporators 665 and the conventional evaporator 675 to the first air discharge port 620.

The air discharge unit 600 further include a first damper 640 that is confirmed to change the direction of the air flow 630 by changing its position. The damper 640 has a first end 641 and a second end 642. The second end 642 attaches to a separation plate 603. In one embodiment, as shown in FIG. 6A, the first end 641 of the damper 640 attaches to the top wall 601 of the housing 605. In the embodiment of FIG. 6A, a majority of the air flow 630 flows through the conventional evaporator 675. In another embodiment, as shown in FIG. 6B, the first end 641 of the damper 640 attaches to the bottom wall 602 of the housing 605. In yet another embodiment, the first end 641 of the damper 640 may be in a position between the top wall 601 and the bottom wall 602 that allows X % of the air flow 630 to flow through the thermal accumulator evaporator 660 and (100−X)% of the air flow 635 to flow through the conventional evaporator 670, wherein X=0~100.

The air discharge unit 600 further includes a first damper 645 that is configured to change the direction of the air flow 635 by changing its position. The damper 645 has a first end 646 and a second end 647. The second end 647 attaches to a separation plate 604. In one embodiment, as shown in FIG. 6A, the first end 646 of the damper 645 attaches to the top wall 601 of the housing 605. In the embodiment of FIG. 6A, a majority of the air flow 635 flows through the conventional evaporator 675. In another embodiment, as shown in FIG. 6B, the first end 646 of the damper 645 attaches to the bottom wall 602 of the housing 605. In yet another embodiment, the first end 646 of the damper 645 may be in a position between the top wall 601 and the bottom wall 602 that allows X % of the air flow 635 to flow through the thermal accumulator evaporator 665 and (100−X)% of the air flow 635 to flow through the conventional evaporator 675, wherein X=0~100.

The air discharge unit 600 further include a first dripping pan 680 configured to collect condensation drippings of at least one of the thermal accumulator evaporator 660 and the conventional evaporator 670. The air discharge unit 600 further includes a second dripping pan 681 configured to collect condensation drippings of at least one of the thermal accumulator evaporator 665 and the conventional evaporator 675.

The air discharge unit 600 may further include a heater (not shown) configure to defrost the thermal accumulator evaporators 660, 665.

The dampers 640, 645 shown in FIG. 6A and FIG. 6B can be controlled for example, by a control system to change position in order to change the direction of the air flows 630, 635. In FIG. 6A, the first damper 640 is in a first position that is in contact with a top wall 601 of the housing 605 in order to direct the majority of the air flow 630 through the conventional evaporator 670. In FIG. 6B, the damper 640 is in a second position that is in contact with a bottom wall 602 of the housing 605 in order to direct the majority of the air flow 630 through tire thermal accumulator evaporator 660. The term "majority" as used herein can means more than about 50% to 100%. It will be appreciated that in some embodiments the damper 640 can be disposed between the top wall 601 and the bottom wall 602.

In FIG. 6A, the second damper 645 is in a first position that is in contact with a top wall 601 of the housing 605 in order to direct the majority of the air flow 635 through the conventional evaporator 675. In FIG. 6B, the damper 645 is in a second position that is in contact with a bottom wall 602 of the housing 605 in order to direct the majority of the air flow 635 through the thermal accumulator evaporator 665. The term "majority" as used herein can means more than about 50% to 100%. It will be appreciated that in some embodiments the damper 645 can be disposed between the top wall 601 and the bottom wall 602.

In one embodiment, the positions of the dampers 640, 645 can be changed by an actuator, e.g., a motor, a spring, or the like, wherein the actuator may be further controlled by a controller that receives instructions, e.g. sensor signals, computer instructions, etc. The positions of the dampers 640, 645 can also be changed passively by the air pressure difference created by the air flows 630, 635. It is noted, there is no limitation on how the damper can be controlled. Any active or passive method known in the art can be applied in the embodiments disclosed in this disclosure.

The embodiments shown in FIGS. 6A and 6B have the advantages of requiring only one air blower, providing full utilization of the blower for both the conventional evaporator and the thermal accumulator evaporator. Advantages further include being in compact size, utilizing of half height of the housing for thermal accumulator evaporator and the other half height for conventional evaporator. Advantages further include having dual air discharges for better climate control.

FIG. 7 illustrates a side view of an embodiment of an air discharge 700 which has two air discharge ports 720, 725. The thermal accumulator evaporator 735 is disposed at the first end 703 of the housing 705 in the lengthwise direction. The conventional evaporator 740 is disposed at the second end 704 of the housing 705 in the lengthwise direction. In one embodiment, the air discharge unit 700 may be used, for example, as part of the TRU 125 shown in FIG. 1. In another embodiment, the air discharge unit 700 can be used, for example, as the air discharge unit 250 shown in FIG. 2, wherein the thermal accumulator evaporator 735 can be the thermal accumulator evaporator 220, the conventional evaporator 740 can be the conventional evaporator 215 and the air blower 710 can be the air blower 251. The heightwise and lengthwise directions are labeled by the arrows in FIG. 7. It is noted that the orientation of the thermal accumulator evaporator 735 and the conventional evaporator 740 is not limited to FIG. 7. In one embodiment, the thermal accumulator evaporator 735 can be disposed at the second end 704 of the housing 705 and conventional evaporator 740 can be disposed at the first end 703 of the housing 705. It should also be understood that the housing 705 of the air discharge unit 700 may include other components in a TRS not shown in FIG. 7. e.g., battery, sensor, controller, genset, flow control device, expansion device, or the like.

It should also be appreciated that the air blower 710 may remain fully functional when the primary power source of climate control is not available. In one embodiment, the air blower 710 may be powered by an independent battery, a solar cell, an independent generator, or the like. In one embodiment, the air blower 710 can be a secondary separate blower from the primary blower for the conventional evaporator 740.

In one embodiment, the thermal accumulator evaporator 735 includes an inner tube portion and a thermal accumulator portion. In one embodiment, the thermal accumulator evaporator 735 includes the inner tube and an outer tube, wherein the heat exchange fluid flows inside of the inner tube (the inner tube portion) and PCM is stored in the space between the inner tube and the outer tube (the thermal accumulator portion). The thermal accumulator evaporator 735 is configured to provide the hold-over climate control capacity. Details of one embodiment of a thermal accumulator evaporator are shown in FIGS. 9A-B.

The conventional evaporator 740 may include one or more heat exchangers. In one embodiment, the conventional evaporator 740 may include a plurality of metal tubes as heat exchangers, wherein a heat transfer fluid, e.g., refrigerant, flows inside of the tube, and an air flow is forced through outside surfaces of the metal tubes.

As shown in FIGS. 7A and 7B, the air discharge unit 700 includes a housing 705. The housing 705 includes an air intake port 715, a first air discharge port 725 disposed proximal to the first end 725, a second air discharge port 720 disposed proximal to the second end 704, an air blower 710 configured to create an air flow 730, in which air is sucked into the housing 705 via the air blower 710 and blown through one or both of the thermal accumulator evaporator 735 and the conventional evaporator 740 to the air discharge ports 725, 720.

The air discharge unit 700 further includes a first damper 755 that is configured to change the direction of the air flow 730 by changing its position. The damper 755 has a first end 756 and a second end 757. The second end 757 attaches to a top wall 701 of the housing 705. The air discharge unit 700 further includes a second damper 760 that is configured to change the direction of the air flow 730 by changing its position. The damper 760 has a first end 761 and a second end 762. The second end 762 attaches to a too wall 701 of the housing 705.

In one embodiment, as shown in FIG. 7A, the first end 756 of the damper 755 attaches to bottom wall 702 of the housing 705 to block the air flow 730 from the blower 710 to the first end 703. The first end 710 of the second damper 760 attaches to the top wall 701 of the housing 705 to allow the air flow 730 from the blower 710 to the second end 704. In the embodiment of FIG. 7A, a majority of the air flow 730 flows through, the conventional evaporator 740.

In another embodiment, as shown in FIG. 7B, the first end 756 of the first damper 755 attaches to the top wall 701 of the housing 705 and the first end 761 of the second damper 760 attaches to the bottom wall 702 of the housing 705, allowing a majority of the air flows through the thermal accumulator evaporator 735.

In yet another embodiment, the first end 750 of the first damper 755 may be in a position between the top wall 701 and the bottom wall 702. The first end 761 of the second damper 760 may be in a position between the top wall 701 and the bottom wall 702. The first damper 755 and the second damper 760 may coordinate with each other to allow X % of the air flow 730 to flow through the thermal accumulator evaporator 735 and (100−X)% of the air flow 730 to flow through the conventional evaporator 740, wherein X=0~100.

The air discharge unit 700 further includes a first dripping pan 745 configured to collect condensation drippings of the thermal accumulator evaporator 735. The air discharge unit 700 further includes a second dripping pan 750 configured to collect condensation drippings of the conventional evaporator 740.

The air discharge unit 700 may further include a heater (not shown) configure to defrost the thermal accumulator evaporator 735.

The dampers 755, 760 shown in FIG. 7A and FIG. 7B can be controlled, for example, by a control system to change position in order to change the direction of the air flow 730. In one embodiment, the positions of the dampers 755, 760 can be changed by an actuator, e.g., a motor, a spring, or the like, wherein the actuator may be further controlled by a controller that receives instructions, e.g. sensor signals, computer instructions, etc. The positions of the dampers 755, 760 can also be changed passively by the air pressure difference created by the air flow 730. It is noted, there is no limitation on how the damper can be controlled. Any active or passive method known in the art can be applied in the embodiments disclosed in this disclosure.

The embodiments shown in FIGS. 7A and 7B have the advantages of requiring only one air blower, providing full utilization of the blower for both the conventional evaporator and the thermal accumulator evaporator. Advantages further include reducing required height by disposing the thermal evaporator and the conventional evaporator at two separate ends of the housing. Advantages further include having dual air discharges for better climate control. Advantages further include maximizing the thermal accumulator storage capacity.

Figure 8A:
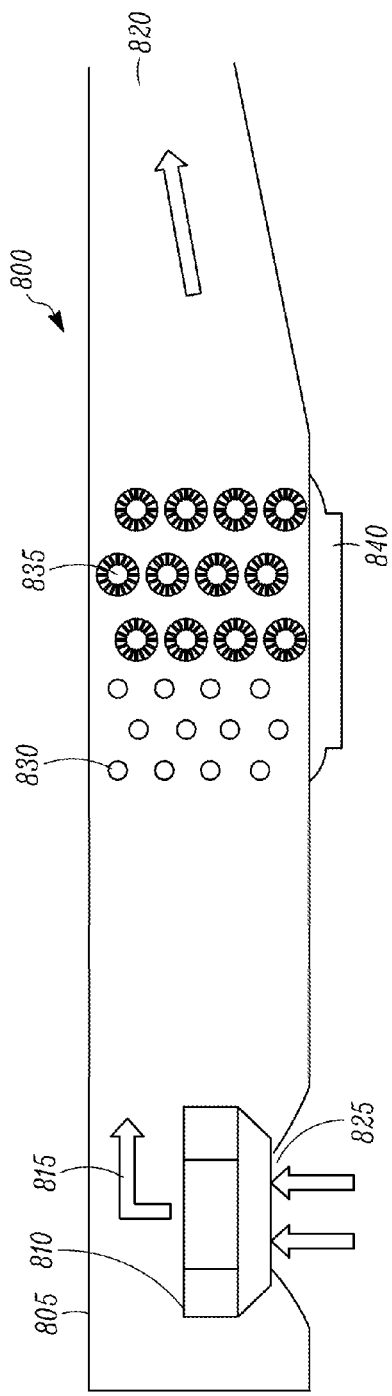
FIGS. 8A, 8B and 8C illustrate side views of an air discharge unit wherein the evaporators are arranged in a lengthwise direction, according to three different embodiments.
Figure 8B:
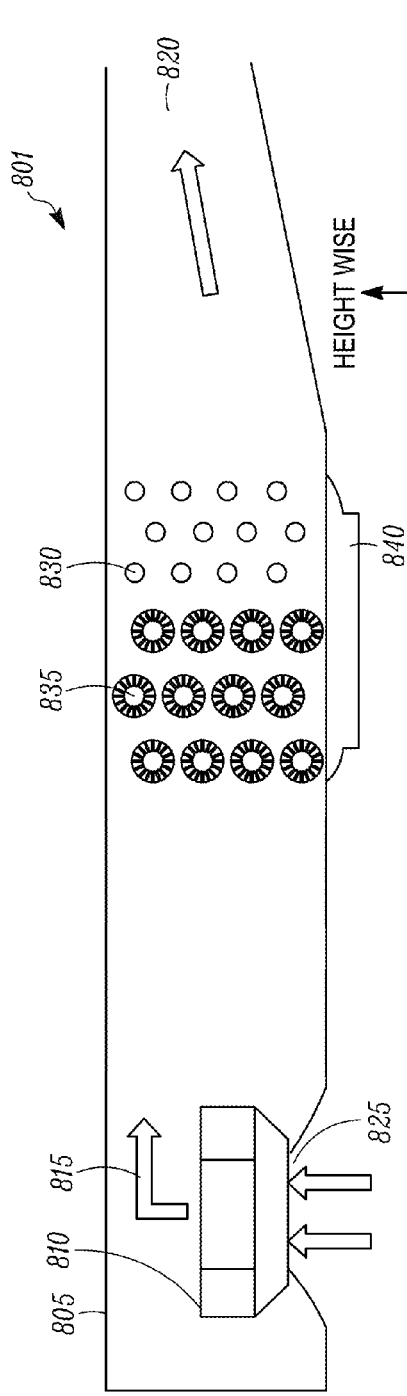
Figure 8C:
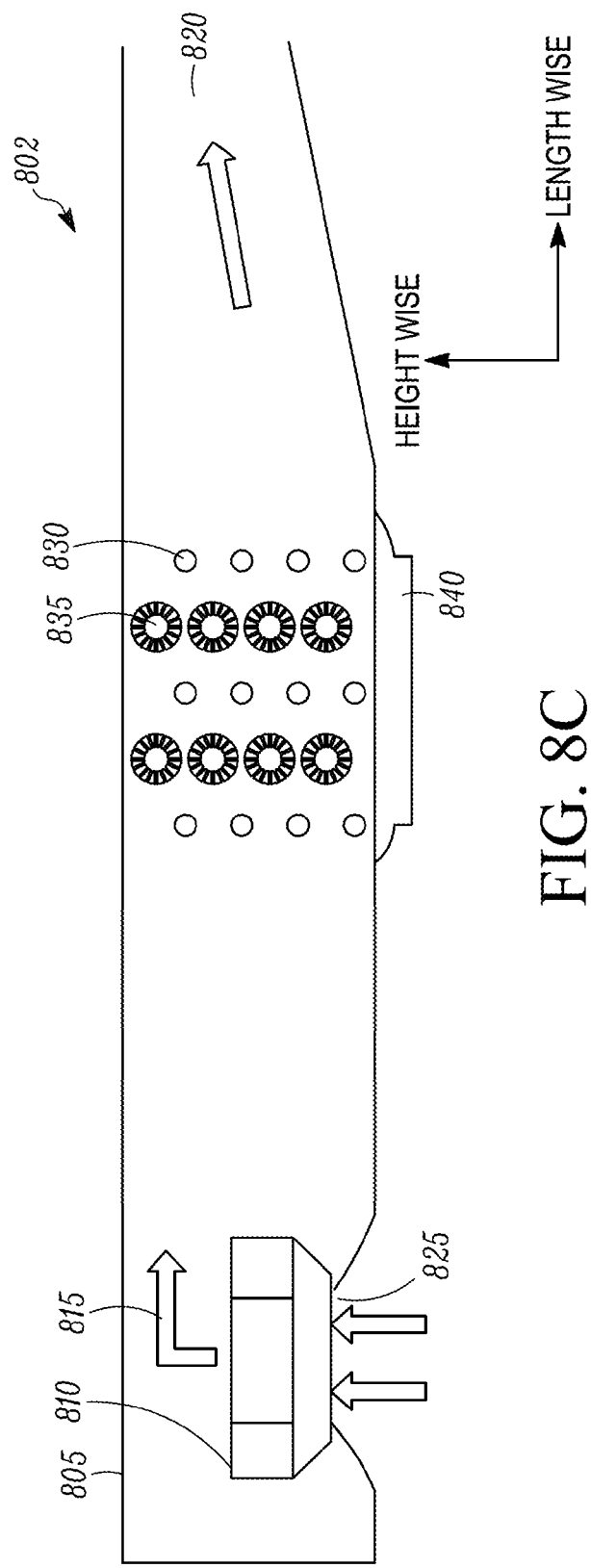

FIGS. 8A-C illustrate a side views of an air discharge unit 800, 801, 802, wherein the evaporators 830, 835 are arranged in a lengthwise direction. In some embodiments, the air discharge units 800, 801, 802 may be used, for example, as part of the TRU 125 shown in FIG. 1. In some embodiments, the air discharge units 800, 801, 802 can be used, for example, as the air discharge unit 250 shown in FIG. 2, wherein the thermal accumulator evaporator 835 can be the thermal accumulator evaporator 220, the conventional evaporator 830 can be the conventional evaporator 215, and the an blower 810 can be the air blower 251. The heightwise and lengthwise directions are labeled by the arrows in FIGS. 8A-8C.

As shown in FIG. 8A, the thermal accumulator evaporator 835 of the air discharge unit 800 is disposed proximal to the air discharge 820 and distal to the air blower 810 comparing to the conventional evaporator 830 in the lengthwise direction the conventional evaporator is disposed proximal to the air blower 810 and distal to the air discharge 820 comparing to the thermal accumulator evaporator 835 in the lengthwise direction. As shown in FIG. 8A, the air flow 815 created by the air blower 810 flows through 830 first and 835 second to the air discharge 820. This orientation allows the thermal accumulates evaporator 835 to be charged when the primary source of climate control is operating.

As shown in FIG. 8B the thermal accumulator evaporator 835 of the air discharge unit 801 is disposed distal to the air discharge 820 and proximal to the air blower 810 comparing to the conventional evaporator 850 in the lengthwise direction. The conventional evaporator 830 is disposed distal to the air blower 810 and proximal to the air discharge 820 comparing to the thermal accumulator evaporator 835 in the lengthwise direction. As shown in FIG. 8B, the air flow 815 created by the air blower 810 flows through the thermal accumulator evaporator 835 first and the conventional evaporator 830 second to the air discharge 820. This orientation allows the thermal accumulator evaporator 835 to be charged when the primary source of climate control is operating.

As shown in FIG. 8C, the thermal accumulator evaporator 835 of the air discharge unit 802 is disposed with the conventional evaporator 830 in an intermingled manner in the lengthwise direction. The air flow 815 created by the air blower 810 flows through both the thermal accumulator evaporator 835 and the conventional evaporator 830 at the same time. This orientation allows the thermal accumulator evaporator 835 to be charged when the primary source of climate control is operating.

It is noted that the orientation of the thermal accumulator evaporator 835 and the conventional evaporator 830 is not limited to the embodiments shown in FIGS. 8A-C. In one embodiment, the thermal accumulator evaporator 835 can be oriented with regard to the conventional evaporator 830 in the widthwise or heightwise direction. It should be understood that the housing 805 of the air discharge units 800, 801, 802 may include other components in a TRS not shown in FIG. 3. e.g., battery, sensor, controller, genset, flow control device, expansion device, or the like.

It should also be appreciated that the air blower 810 may remain fully functional when the primary power source of climate control is not available. In one embodiment, the air blower 810 may be powered by an independent battery, a solar cell, an independent generator, or the like. In one embodiment, the air blower 810 can be a secondary separate blower from a primary blower.

In one embodiment, as shown in FIG. 3, the thermal accumulator evaporator 835 includes an inner tube portion and a thermal accumulator portion. In one embodiment, the thermal accumulator evaporator 835 includes the inner tube and an outer tube, wherein the heat exchange fluid flows inside of the inner tube (the inner tube portion) and PCM is stored in the space between the inner tube and the outer tube (the thermal accumulator portion). The thermal accumulator evaporator 835 is configured to provide the hold-over climate control capacity. Details of one embodiment of a thermal accumulator evaporator are shown in FIGS. 9A-B.

The conventional evaporator 835 may include one or more heat exchangers. In one embodiment, the conventional evaporator 830 may include a plurality of metal tubes as heat exchangers, wherein a heat transfer fluid, e.g., refrigerant, flows inside of the tube, and an air flow is forced through outside surfaces of the metal tubes.

As shown in FIGS. 8A-C, the air discharge units 800, 801, 802 include a housing 805. The housing 805 includes an air intake port 825, an air discharge port 820, an air blower 810 configured to create an air flow 815, in which air is sucked into the housing 805 via the air blower 810 and blown through both of the thermal accumulator evaporator 835 and the conventional evaporator 830 to the air discharge port 820.

The air discharge units 800, 801, 802 further includes a dripping pan 840 configured to collect condensation drippings of at least one of the thermal accumulator evaporator 835 and the conventional evaporator 830.

The air discharge units 800, 801, 802 may further include a heater (not shown) configures to defrost the thermal accumulator evaporator 835.

It is noted that the embodiments of the thermal accumulators 220, 305, 435, 520, 665, 660, 735, and 835 discussed in FIGS. 2-8C are exemplary only and is in no way limiting the scope of the disclosure.

FIGS. 9A and 9B illustrate different views of a spine fin tube 900 that can be used, for example, as one of the plurality of thermal accumulator evaporators 305, 435, 520, 660, 665, 735, 835 shown in FIGS. 3A-8C.

FIG. 9A shows an end view of the spine fin tube 900. As shown in FIG. 9A, the spine fin tube 900 includes a plurality of spine fins 905, an inner tube 910, a fluid channel 915 in the inner tube, an outer tube 920, and a space 906 between the inner tube 910 and the outer tube 920. In one embodiment, the PCM can be stored in the inner space 906 and heat transfer fluid, e.g., refrigerant, can flow inside of the fluid channel 915.

The spine fins 905 are fin-shape protrusions, protruding from the outer surface of the inner tube 910 into the space 906. The spine fins 905 may or may not be in contact with the inner surface of the outer tube 920. The spin fins 905 are configured to enhance heat-exchanging efficiency between the heat transfer fluid flowing in the inner tube 910 through the fluid channel 915 and the PCM stored in the space 906 between the inner tube 910 and the outer tube 920. It is noted that in some embodiments, a non-PCM fluid with a high latent heat capacity may also be used in the space 906 to perform the heat-exchange process.

The inner tube 910, the spine fins 905, and the outer tube 920 can be made with any material that is suitable for performing heat exchanging process. In one embodiment, the inner tube 910, the spine fins 905, and the outer tube 920 may be made, for example, with copper, aluminum, steel, alloy, or the like.

The term PCM include, for example, a material that can store or release a large amount of energy upon a phase change (e.g., from a solid to a liquid, a liquid to a solid, etc.) while remaining at about a constant temperature. A PCM can gradually absorb heat (e.g., from an interior space of a refrigerated transport unit, etc.) while remaining at about a constant temperature during a phase transformation from a solid state into a liquid state. A PCM can, for example, be used to maintain an interior space of a refrigerated transport unit at a desired temperature.

In some embodiments, the PCM contained within the space 906 can include, for example, ethylene glycol, propylene glycol, or the like. In some embodiments, the PCM is a eutectic solution, while in other embodiments the PCM is a non-eutectic solution. In one embodiment, the PCM can be PlusICE-29 for frozen foods, pharmaceuticals, and/or goods. In another embodiment, the PCM can be PCM Neg 10 for refrigerated foods, pharmaceuticals, and/or goods.

In some embodiments, PCM may be chosen to be aluminum compatible. The PCM can include a mixture having hydrogen peroxide ($H_2O_2$). Suitable mixtures include solutions having between about 1 percent hydrogen peroxide and about 35 percent hydrogen peroxide. In some embodiments, the hydrogen peroxide can be mixed with distilled water. In other embodiments, the PCM contained within the housing 205 can include a mixture having between about 1 percent and about 50 percent propylene glycol. In some embodiments, the PCM can be a commercially available PCM, such as Pure Temp −37 (sold by Entropy Solutions, Inc.) or PlusICE E-34 (sold by PCM Products Limited). In some embodiments, the aluminum compatible PCM can include a solution of propylene glycol ($C_3H_8O_2$). The concentration of propylene glycol can vary according to, for example, a desired phase change temperature for the PCM. In some embodiments, the concentration of propylene glycol can, for example, be about 50%.

In one embodiment, the appropriate PCM can be chosen based on its phase change temperature, e.g. solid→liquid and/or liquid→gas, and a target temperature of the interior space of a transport unit. In one example, the target temperature of the interior space of a transport unit can be about 4° C. and the PCM can have a solid to liquid phase change temperature of about −4° C. In another example, the target temperature of the interior space of a transport unit can be about −5° C. and the PCM can have a solid to liquid phase change temperature of about −15° C. In another example, the target temperature of the interior space of a transport unit is about −18° C. and the PCM has a solid to liquid phase change temperature of about −28° C.

The difference between the target temperature of the interior space of the transport unit and the phase change temperature is defined as $\Delta T$. $\Delta T$ can be expressed as the following equation: $\Delta T$=(target temperature of the interior space of the transport unit)−(phase change temperature of the PCM). A PCM providing a specific $\Delta T$ can be selected based on the need of the hold-over capacity and the available air flow provided by a discharge unit. In one embodiment that the climate control is cooling, a selection of PCM can have a $\Delta T \geq 0$. In another embodiment for cooling climate control $\Delta T$ can be from ~0 to ~30° C. In another embodiment, that the climate control is heating, a selection of PCM can have a $\Delta T \leq 0$. In another embodiment of heating climate control, $\Delta T$ can be from ~0 to −30° C.

In one embodiment, one or more PCMs may be chosen to provide different hold-over climate controls for different temperature requirements, e.g., multiple zone transport unit. In one embodiment, the transport unit may have two temperature zones, one being 5° C. zone, the other being −5° C. zone. Two separate thermal accumulator evaporators with two different PCMs may be applied. For the 5° C. zone, the PCM may have a solid to liquid phase change temperature around −5° C. ($\Delta T$ is around 10° C. For the −5° C. zone, the PCM may have a solid to liquid phase change temperature around −15° C. ($\Delta T$ is around 10° C.).

It is appreciated that the above examples of types of PCM that can be used are merely exemplary and can be modified based on the requirements desired of the spine fin tube 900.

FIG. 9B shows a side view of a spine fin tube 900, wherein the inner tube 910 and the spine fins 905 are exposed for illustrative purposes. FIG. 9B shows the outer tube 920, the inner tube 910, the spine fins 905, the space 906 between the inner tube 910 and the outer tube 920, and the fluid channel 915.

It is noted that the embodiments for one of the plurality of thermal accumulator evaporators 305, 435, 520, 660, 665, 735, 835 shown in FIGS. 3A-8C are not limited to the embodiments shown in FIGS. 9A-B. In one embodiment, the inner tube 910 and the outer tube 920 may both have spine fins. In one embodiment, the inner tube 910 and/or the outer tube 920 may have one or more grooves. In another embodiment, the inner tube 910 and or the outer tube 920 may include one or more fin protrusions configured to facilitate the heat-exchange process. In one embodiment, the one or more fin protrusions may be spiral fins, parallel fins, shifted fins, or the like, in another embodiment, one outer tube 920 may include a plurality of inner tubes 910 disposed in parallel inside of the outer tube 920. The plurality of inner tubes 910 can be configured to facilitate the heat-exchange process by increasing the contact surface areas between the surface of the inner tubes 910 and PCM stored in the space 906 between the inner tubes 910 and the outer tube 920. It should be appreciated that the sizes, the shapes, the protrusion patterns, and/or the manufacturing processes of the inner tube 910 and the outer tube 920 can be designed to meet the needs of the system using the spine fin tube 900.

It is noted that the embodiments for one of the plurality of thermal accumulator evaporators 305, 435, 520, 660, 665, 735, 835 shown in FIGS. 3A-8C is not limited to cooling climate control and can be used for heating climate control. In one embodiment, for heating climate control, the phase change temperature of a PCM can be selected to be higher than the target temperature of the interior space of a transport unit (e.g., $\Delta T$=target temperature−phase change temperature$\leq 0$). In one embodiment, the target temperature for the interior space of a transport unit can be about 35° F. and the solid to liquid phase change temperature of the PCM can be about 45° F.

In one embodiment, the refrigeration circuit 200 can include a heater configured to heat up the heat transfer fluid. The heater can be disposed anywhere in the refrigeration circuit 200 deemed appropriate for the purpose of providing heating climate control. In one embodiment, the heater can be heater bars disposed in the air discharge unit 250. In this embodiment, the heater bars can be used for (1) heating up the heat transfer fluid for heating climate control and/or (2) defrost the thermal accumulator 220.

Figure 10:
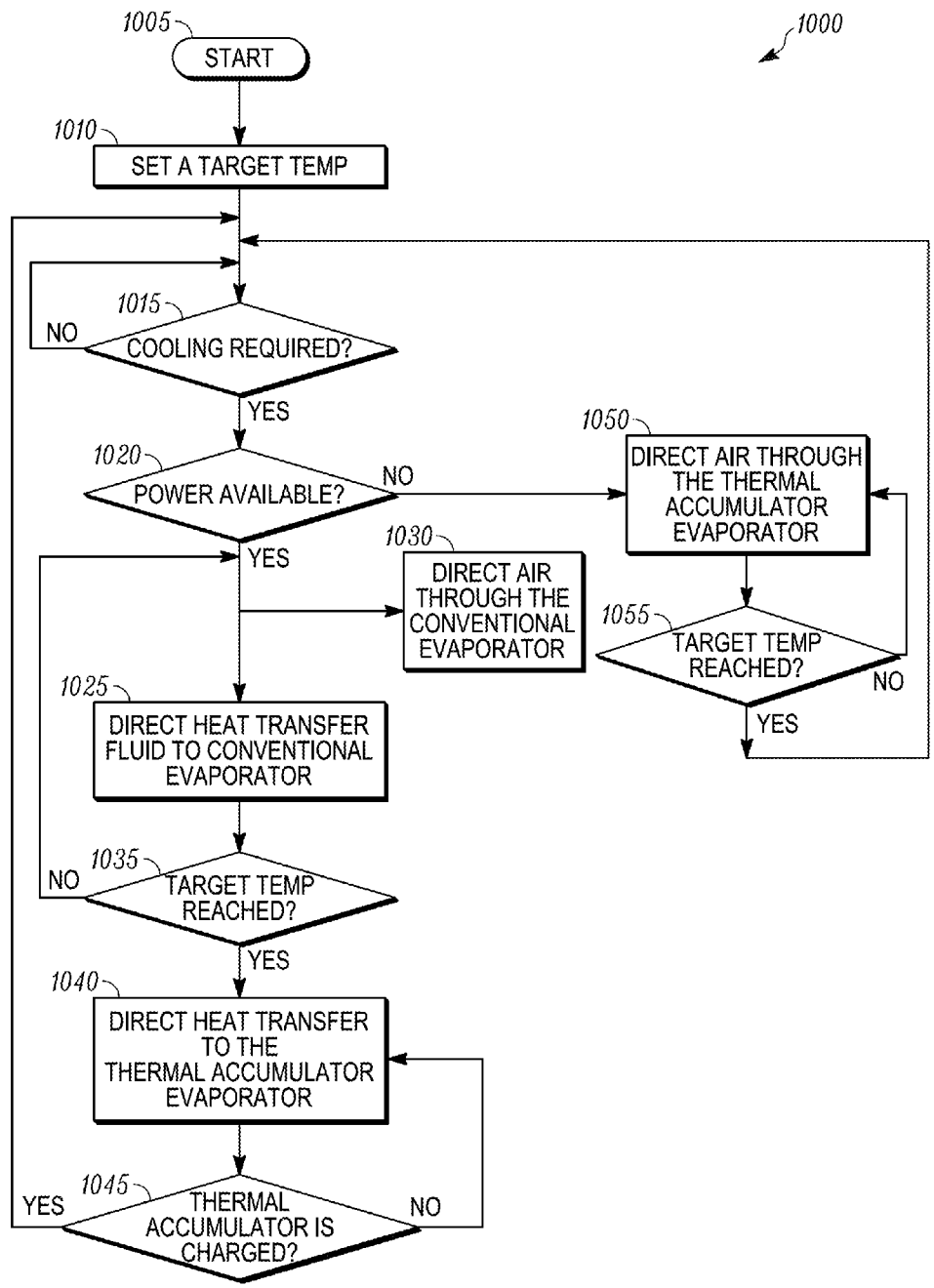
FIG. 10 illustrates a flow chart of a method for controlling a refrigeration circuit, according to one embodiment.

FIG. 10 shows a block diagram of a method 1000 for controlling the refrigeration circuit 200 shown in FIG. 2 for the refrigerated transport unit 100 shown in FIG. 1. It will be appreciated that any of the air discharge units 300, 400, 500, 600, 700 and 800 described in FIGS. 3A-8C can be used as the air discharge unit 250 in the method 1000 for controlling the refrigeration circuit 200 discussed below, it is noted the method 1000 is not limited to refrigeration. The method 1000 can also be used for heating. The term "climate control" refers to cooling and/or heating. In other words, the air discharge units 300, 400, 500, 600, 700 and 800 described in FIGS. 3A-8C can be designed with appropriate PCM to provide hold-over heating capacity.

At 1005, the method 1000 starts. At 1010, a control system (e.g., a TRS controller) that is configured to control the refrigeration circuit 200 sets a target temperature for the climate control of the interior space 120—of the transport unit 110.

At 1015, the control system determines whether climate control of the interior space 120 is required. This can be done, for example, by the control system determining an internal temperature within the internal space 120 and comparing the target temperature with the internal temperature. In one example, climate control can be required, when the target temperature is higher than the internal temperature, in another example, climate control can be required when the target temperature is lower than the internal temperature. If the control system determines that climate control within the interior space 120 is required, the method 1000 proceeds to 1020. If the control system determines that climate control within the interior space 120 is not required, the method 1000 returns to 1015.

At 1020, the control system determines whether sufficient power is available for the TRS 105 to provide climate control within the interior space 120. This may include, but is not limited to, checking whether the engine of the tractor 115 is running, checking whether a generator of the TRS 105 is running, checking whether battery power of the TRS 105 is available, checking whether an electrical power is available from an alternator of the TRS 105 or a shore power source connected to the TRS 105, etc. If the control system determines that sufficient power is available, the method 1000 proceeds to 1025 that directs heat transfer fluid to the conventional evaporator. If the control system determines that sufficient power is not available, the method 1000 proceeds to 1050 that directs air through the thermal accumulator evaporator.

At 1025, the control system instructs the refrigeration circuit 200 to direct the heat, transfer fluid to a conventional evaporator. This conventional evaporator can be the embodiments of conventional evaporators 310, 430, 525, 670, 675, 740, and 830 discussed in FIGS. 3A-8C. The direction of heat transfer fluid by the control system may be done through controlling the flow control devices 225, 240, 245 in the refrigeration circuit 200.

At 1030, when the control system determines that the power is available at 1020, the control system directs an air flow to the conventional evaporator to provide climate control to the interior space of the transport unit. The air flow may be directed through the air blowers 251, 330, 410, 510, 610, 710, and 810 discussed in FIGS. 2-8C. The conventional evaporator can be the embodiments of conventional evaporators 215, 310, 430, 525, 670, 675, 740, and 830 discussed in FIGS. 2-8C.

At 1035, the control system determines whether the ambient temperature of the interior space of the transport unit reached the target temperature. This determination can be done through temperature sensors mounted inside of the interior space of the transport unit. If the target temperature is reached, the method 1000 proceeds to 1040 that directs heat transfer fluid to a thermal accumulator evaporator. If the target temperature is not reached, 1025, 1030 and 1035 repeat until the target temperature is reached.

Steps 1025, 1030, and 1035 may represent the conventional climate control provided with the primary power source.

At 1040, when target temperature is reached, the control system directs heat transfer fluid, e.g., refrigerant, to the thermal accumulator evaporator. This thermal accumulator evaporator can be the embodiments of the thermal accumulators 220, 305, 435, 520, 665, 660, 735, and 835 discussed in FIGS. 2-8C. Step 1040 provides heat-exchange between a PCM stored in the thermal accumulator and the heat transfer fluid flowing in the evaporator. Step 1040 can be considered as charging the PCM for future hold-over climate control capacity. When the climate control is cooling, the heat transfer fluid absorbs the heat from the PCM. When the climate control is heating, the heat transfer fluid provides heat to the PCM.

At 1045, the control system determines whether the thermal accumulator is charged. Whether the thermal accumulator is charged may depend on the user and/or the purpose of the hold-over climate control. In one embodiment, the temperature of the PCM can be below its phase change temperature to be considered charged. In one embodiment, the temperature of the PCM can be at the phase change temperature to be considered charged. In another embodiment, the temperature of the PCM can be above the phase change temperature to be considered charged. It will be appreciated that the embodiments discussed above are merely exemplary and that other criteria can be used to determine whether the thermal accumulator is considered charged. When the thermal evaporator is not charged, steps 1040 and 1045 repeat. When the thermal evaporator is charged, the method 1000 returns to step 1015.

Steps 1040 and 1045 may represent the charging process of the thermal accumulator evaporator.

At 1050, when the control system determines that the primary climate control power at 1020 is not available, the control system directs air flow through the thermal accumulator evaporator. This thermal accumulator evaporator can be the embodiments of the thermal accumulators 220, 305, 435, 520, 665, 660, 735, and 835 discussed in FIGS. 2-8C. The air flow may be directed through the air blowers 251, 330, 410, 510, 610, 710, and 810 discussed in FIGS. 2-8C.

At 1055, the control system determines whether the ambient temperature of the interior space of the transport unit reached the target temperature. If the target temperature is not reached, steps 1050 and 1055 repeat. If target temperature is reached, method 1000 proceeds to step 1015.

Steps 1050 and 1055 represents the use of thermal accumulator evaporator as a hold-over climate control source when the primary source of climate control is not available.

In another embodiment of the control method 1000 of the refrigeration circuit 200 can use ambient air outside the transport unit to charge the thermal accumulator evaporator. In one embodiment, the relatively colder ambient air can be used to charge the thermal accumulator evaporator for cooling hold-over capacity. In another embodiment, the relatively hotter ambient air can be used to charge the thermal accumulator evaporator for heating hold-over capacity.

In another embodiment of the control method 1000 of the refrigeration circuit 200, the method can use ambient air from the interior space of the transport unit to charge the thermal accumulator evaporator. In one embodiment, the transport unit has multiple temperature zones. The ambient air from the relatively colder zone can be used to charge the thermal accumulator evaporator for cooling hold-over capacity for the relatively hotter zone. In another embodiment, the ambient air from the relatively hotter zone can be used to charge the thermal accumulator evaporator for heating hold-over capacity for the relatively colder zone.

In another embodiment of the control method 1000 of the refrigeration circuit 200, the thermal accumulator evaporator can be pre-charged before the refrigerated transport unit hits the road. The refrigerated transport unit mentioned herein can be the refrigerated transport unit 100 discussed in FIG. 1. In one embodiment, the power source of pre-charging the thermal accumulator evaporator can be electrical power from the power grid, solar power, battery, etc.

In another embodiment of the control method 1000 of the refrigeration circuit 200, hold-over climate capacity provided by the thermal accumulator evaporator may be desired because of law and regulations, instead of unavailable power source. In one embodiment, the refrigerated transport unit travels through an area that has zoning ordinance for noise restrictions. In order to comply with the noise restrictions, the power source of the primary climate control may have to be turned off. In such a situation, the hold-over climate control capacity may be desired, even if the power source of the primary climate control is technically available.

ASPECTS

It is noted that any of aspects 1-13, aspects 14-21, aspect 22, and aspects 23-26 can be combined.

Aspect 1. A transport refrigeration turn comprising:
a compressor configured to compress a heat transfer fluid;
a condenser disposed downstream of the compressor, the condenser configured to condense the heat transfer fluid from a gaseous state to a liquid state;
an expansion device disposed downstream of the condenser, the expansion device configured to release pressure of the heat transfer fluid;
a first flow control device disposed downstream of the condenser, the first flow control device configured to direct the heat transfer fluid downstream of the expansion device;
a first evaporator disposed downstream of the expansion device and the first flow control device;
a second evaporator disposed downstream of the expansion device and the first flow control device, wherein the second evaporator includes a thermal accumulator.

Aspect 2. The transport refrigeration unit of Aspect 1, wherein the expansion device includes:
a first expansion valve disposed downstream of the first flow control device and upstream of the first evaporator; and
a second expansion valve disposed downstream of the first flow control device, downstream of the second flow control device, and upstream of the second evaporator.

Aspect 3. The transport refrigeration unit of any one of Aspect 1 or 2, wherein the expansion device further includes, a first expansion valve disposed downstream of the condenser and upstream of the first flow control device.

Aspect 4. The transport refrigeration unit of any one of Aspects 1-3, wherein the first flow control device includes a three-way valve.

Aspect 5. The transport refrigeration unit of any one of Aspects 1-3, wherein the first flow control device includes two two-way valves.

Aspect 6. The transport refrigeration unit of any one of Aspects 1-5, further comprising:
a second flow control device disposed downstream of the first evaporator and upstream of the compressor.

Aspect 7. The transport refrigeration unit of Aspect 6, wherein the second flow control device includes a three-way valve.

Aspect 8. The transport refrigeration unit of Aspect 6, wherein the second flow control device includes two two-way valves.

Aspect 9. The transport refrigeration unit of Aspect 6, wherein the first flow control device and the second flow control device can be set in a first mode, such that a heat transfer fluid does not flow through the second evaporator.

Aspect 10. The transport refrigeration unit of Aspect 6, wherein the first flow control device and the second flow control device can be set in a second mode, such that a heat transfer fluid does not flow through the first evaporator.

Aspect 11. The transport refrigeration unit of Aspect 6, wherein the first flow control device and the second flow control device can be set in a third mode, such that a heat transfer fluid flows through the first evaporator and the second evaporator in parallel.

Aspect 12. The transport refrigeration unit of Aspect 6, wherein the first flow control device and the second flow control device can be set in a fourth mode, such that a heat transfer fluid flows through the first evaporator and the second evaporator in series.

Aspect 13. The transport refrigeration unit of any one of Aspects 1-12, wherein the thermal accumulator includes a spine fin tubing.

Aspect 14. A transport refrigeration unit comprising:
a compressor configured to compress a heat transfer fluid;
a condenser disposed downstream of the compressor, the condenser configured to condense the heat transfer fluid from a gaseous state to a liquid state;
an expansion device disposed downstream of the condenser, the expansion device configured to release pressure of the heat transfer fluid;
a first flow control device disposed downstream of the condenser;
a second flow control device disposed upstream of the compressor; and
an air discharge unit defined by a housing, the air discharge unit including;
an air intake port,
a first air discharge port,
an air blower creating a first air flow from the air intake port to the first air discharge port,
a first evaporator disposed in the housing, the first evaporator being disposed downstream of the expansion device and the first flow control device, the first evaporator being disposed upstream of the second flow control device, and
a second evaporator disposed in the housing, the second evaporator being disposed downstream of the first flow control device, the expansion device, and the second flow control device, the second evaporator including a thermal accumulator.

Aspect 15. The transport refrigeration unit according to Aspect 14, wherein the air discharge unit includes a dripping pan configured to collect condensation drippings of at least one of the first evaporator and second evaporator.

Aspect 16. The transport refrigeration unit according to any one of Aspects 14 or 15, wherein the housing further includes a damper, wherein the damper changes its position to direct the first air flow through the first evaporator and/or the second evaporator.

Aspect 17. The transport refrigeration unit according to any one of Aspects 14-16, wherein the first evaporator and the second evaporator are arranged in a heightwise direction within the housing.

Aspect 18. The transport refrigeration unit according to any one of Aspects 14-16, wherein the first evaporator and the second evaporator are arranged in a widthwise direction within the housing.

Aspect 19. The transport refrigeration unit according to any one of Aspects 14-16, wherein the first evaporator and the second evaporator are arranged in a lengthwise direction within the housing.

Aspect 20. The transport refrigeration unit according to any one of Aspects 14-19, wherein the air discharge unit includes;
a second air discharge port, wherein the air blower creates a second air flow from the air intake port to the second air discharge port;
a first damper controlling the first air flow to flow through the first evaporator; and
a second damper controlling the second air flow to flow through the second evaporator.

Aspect 21. A transport refrigeration unit according to any one of Aspects 14-20, wherein the air discharge unit includes:
   a second air discharge port, wherein the air blower creates a second air flow from the air intake port to the second air discharge port;
   a third evaporator disposed in the housing, the third evaporator being disposed downstream of the expansion device and the first flow control device, the third evaporator being disposed upstream of the second flow control device.
   a fourth evaporator disposed in the housing, the fourth evaporator being disposed downstream of the first flow control device, the expansion device, and the second flow control device, the fourth evaporator including a second thermal accumulator.
   a first damper directing the first air flow through the first evaporator and/or the second evaporator, and
   a second damper directing the second air flow through the third, evaporator and/or the fourth evaporator.

Aspect 22. A transport refrigeration unit comprising:
   a compressor configured to compress a heat transfer fluid;
   a condenser disposed downstream of the compressor, the condenser configured to condense the heat transfer fluid from a gaseous state to a liquid state;
   an expansion device disposed downstream of the condenser, the expansion device configured to release pressure of the heat transfer fluid;
   a first flow control device disposed downstream of the condenser;
   a second flow control device disposed upstream of the compressor; and
   a first air discharge unit defined by a first housing, the first air discharge unit including;
      a first air intake port,
      a first air discharge port,
      a first air blower creating a first air flow from the first air intake port to the first air discharge port,
      a first evaporator disposed in the first housing, the first evaporator being disposed downstream of the expansion device and the first flow control device, the first evaporator being disposed upstream of the second flow control device, and
      first dripping pan configured to collect condensation drippings of the first, evaporator;
   a second air discharge unit defined by a second housing, the second air discharge unit including:
      a second air intake port,
      a second air discharge port,
      a second air blower creating a second air flow from the second air intake port to the second air discharge port,
      a second evaporator disposed in the second housing, the second evaporator being disposed downstream of the first flow control device, the expansion device, and the second flow control device, the second evaporator including thermal accumulator, and
      a second dripping pan configured to collect condensation drippings of the second evaporators.

Aspect 23. A method of operating a transport refrigeration unit;
   determining a target temperature for an internal space;
   monitoring a temperature within the internal space;
   comparing the monitored temperature to the target temperature;
   determining whether cooling is required within the internal space based on the comparison between the monitored temperature and the target temperature;
   determining whether power for the transport refrigeration unit is available;
   directing air flow through a first evaporator when power is available and cooling is required;
   directing air flow through a second evaporator that includes a thermal accumulator when power is not available and cooling is required.

Aspect 24. The method of operating a transport refrigeration unit according to Aspect 23, further comprising directing heat transfer fluid to the first evaporator when power is available and when cooling is required.

Aspect 25. The method of operating a transport refrigeration unit according to any one of Aspects 23 or 24, further comprising directing heat transfer fluid to the second evaporator when power is available to charge the thermal accumulator.

Aspect 26. The method of operating a transport refrigeration unit according to any one of Aspects 24-26, further comprising:
   stopping the air flow that is flowing through the second evaporator when the monitored temperature reaches the target temperature.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A transport refrigeration unit comprising:
   a compressor configured to compress a heat transfer fluid;
   a condenser disposed downstream of the compressor, the condenser configured to condense the heat transfer fluid from a gaseous state to a liquid state;
   an expansion device disposed downstream of the condenser, the expansion device configured to release pressure of the heat transfer fluid;
   a first flow control device disposed downstream of the condenser, the first flow control device configured to direct the heat transfer fluid downstream of the expansion device;
   a first evaporator disposed downstream of the expansion device and the first flow control device;
   a second evaporator disposed downstream of the expansion device and the first flow control device, wherein the second evaporator includes a thermal accumulator;
   a second flow control device disposed downstream of the first evaporator and upstream of the compressor;
   a third flow control device disposed downstream of the second evaporator and upstream of the compressor,
   wherein the transport refrigeration unit is configured to operate in a series mode such that the first flow control device, the second flow control device, and the third flow control device are controlled to direct the flow of heat transfer fluid from an outlet of one of the first evaporator and the second evaporator to an inlet of the other of the first evaporator and the second evaporator.

2. The transport refrigeration unit of claim 1, wherein the second flow control device includes a three-way valve.

3. The transport refrigeration unit of claim 1, wherein the second flow control device includes two two-way valves.

4. The transport refrigeration unit of claim 1, wherein the transport refrigeration unit is configured to operate in a first evaporator mode such that the first flow control device, the second flow control device, and the third flow control device are controlled to direct the flow of heat transfer fluid through the first evaporator and prevent the flow of heat transfer fluid through the second evaporator.

5. The transport refrigeration unit of claim 1, wherein the transport refrigeration unit is configured to operate in a second evaporator mode such that the first flow control device, the second flow control device, and the third flow control device are controlled to direct the flow of heat transfer fluid through the second evaporator and prevent the flow of heat transfer fluid through the first evaporator.

6. The transport refrigeration unit of claim 1, wherein the transport refrigeration unit is configured to operate in a parallel mode such that the first flow control device, the second flow control device, and the third flow control device are controlled to direct the flow of heat transfer fluid through the first evaporator and the second evaporator in parallel.

7. The transport refrigeration unit of claim 1, wherein the thermal accumulator includes a spine fin tubing.

8. A transport refrigeration unit comprising:
a compressor configured to compress a heat transfer fluid;
a condenser disposed downstream of the compressor, the condenser configured to condense the heat transfer fluid from a gaseous state to a liquid state;
an expansion device disposed downstream of the condenser, the expansion device configured to release pressure of the heat transfer fluid;
a first flow control device disposed downstream of the condenser;
a second flow control device disposed downstream of a first evaporator upstream of the compressor;
a third flow control device disposed downstream of a second evaporator and upstream of the compressor; and
an air discharge unit defined by a housing, the air discharge unit including:
an air intake port,
a first air discharge port,
an air blower creating a first air flow from the air intake port to the first air discharge port,
the first evaporator disposed in the housing, the first evaporator being disposed downstream of the expansion device and the first flow control device, the first evaporator being disposed upstream of the second flow control device, and
a second evaporator disposed in the housing, the second evaporator being disposed downstream of the first flow control device, the expansion device, and the third flow control device, the second evaporator including a thermal accumulator,
wherein the transport refrigeration unit is configured to operate in a series mode such that the first flow control device, the second flow control device, and the third flow control device are controlled to direct the flow of heat transfer fluid from an outlet of one of the first evaporator and the second evaporator to an inlet of the other of the first evaporator and the second evaporator.

9. The transport refrigeration unit according to claim 8, wherein the housing further includes a damper, wherein the damper changes its position to direct the first air flow through the first evaporator and/or the second evaporator.

10. The transport refrigeration unit according to claim 8, wherein the first evaporator and the second evaporator are arranged in a heigthwise direction within the housing.

11. The transport refrigeration unit according to claim 8, wherein the first evaporator and the second evaporator are arranged in a widthwise direction within the housing.

12. The transport refrigeration unit according to claim 8, wherein the first evaporator and the second evaporator are arranged in a lengthwise direction within the housing.

13. The transport refrigeration unit according to claim 8, wherein the air discharge unit includes:
a second air discharge port, wherein the air blower creates a second air flow from the air intake port to the second air discharge port;
a first damper controlling the first air flow to flow through the first evaporator; and
a second damper controlling the second air flow to flow through the second evaporator.

14. A transport refrigeration unit according to claim 8, wherein the air discharge unit includes:
a second air discharge port, wherein the air blower creates a second air flow from the air intake port to the second air discharge port;
a third evaporator disposed in the housing, the third evaporator being disposed downstream of the expansion device and the first flow control device, the third evaporator being disposed upstream of the second flow control device,
a fourth evaporator disposed in the housing, the fourth evaporator being disposed downstream of the first flow control device, the expansion device, and the second flow control device, the fourth evaporator including a second thermal accumulator,
a first damper directing the first air flow through the first evaporator and/or the second evaporator, and
a second damper directing the second air flow through the third evaporator and/or the fourth evaporator.

15. The transport refrigeration unit of claim 1, wherein the thermal accumulator includes a heat exchanger tube that includes an inner tube, a fluid channel in the inner tube, an outer tube, a phase change material stored in a space between the inner tube and the outer tube, and a plurality of protrusions from an outer surface of the inner tube and that are configured to enhance heat exchanging efficiency between the heat transfer fluid flowing in the inner tube through the fluid channel and the phase change material stored in the space between the inner tube and the outer tube.

16. The transport refrigeration unit of claim 8, wherein the thermal accumulator includes a heat exchanger tube that includes an inner tube, a fluid channel in the inner tube, an outer tube, a phase change material stored in a space between the inner tube and the outer tube, and a plurality of protrusions from an outer surface of the inner tube and that are configured to enhance heat exchanging efficiency between the heat transfer fluid flowing in the inner tube through the fluid channel and the phase change material stored in the space between the inner tube and the outer tube.

* * * * *